US010944611B2

(12) United States Patent
(10) Patent No.: US 10,944,611 B2
(45) Date of Patent: Mar. 9, 2021

Ko et al.

(54) METHOD FOR TRANSMITTING OR RECEIVING SIGNAL USING LONG SEQUENCE AND APPARATUS THEREFOR

(71) Applicant: LG ELECTRONICS INC., Seoul (KR)

(72) Inventors: Hyunsoo Ko, Seoul (KR); Bonghoe Kim, Seoul (KR); Byounghoon Kim, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/799,538

(22) Filed: Feb. 24, 2020

(65) Prior Publication Data

US 2020/0195482 A1 Jun. 18, 2020

Related U.S. Application Data

(63) Continuation of application No. 15/770,128, filed as application No. PCT/KR2016/011826 on Oct. 20, 2016, now Pat. No. 10,623,227.

(Continued)

(51) Int. Cl.

| | |
|---|---|
| ***H04L 27/26*** | (2006.01) |
| ***H04W 72/04*** | (2009.01) |
| ***H04W 56/00*** | (2009.01) |
| ***H04J 13/00*** | (2011.01) |
| ***H04J 11/00*** | (2006.01) |

(52) U.S. Cl.

CPC ...... *H04L 27/2655* (2013.01); *H04J 11/0073* (2013.01); *H04J 11/0076* (2013.01); *H04J 13/00* (2013.01); *H04L 27/2613* (2013.01); *H04L 27/2692* (2013.01); *H04W 56/001* (2013.01); *H04W 72/042* (2013.01); *H04J 2211/005* (2013.01)

(58) Field of Classification Search

None

See application file for complete search history.

(56) References Cited

U.S. PATENT DOCUMENTS 9,185,728 B2 * 11/2015 Moon ................ H04W 74/006
10,206,189 B2 2/2019 Lin et al.

(Continued)

FOREIGN PATENT DOCUMENTS

WO 2015030548 3/2015

OTHER PUBLICATIONS

Qualcomm Inc., "Sequence Design for NB-IOT SYNC Channel", Oct. 9, 2015, 3GPP TSG RAN WG1 #82 BIS, pp. 1-4 (Year: 2015).*

(Continued)

*Primary Examiner* — Steve R Young

(74) *Attorney, Agent, or Firm* — Lee Hong Degerman Kang Waimey

(57) ABSTRACT

The present document relates to a method for transmitting a signal using a long sequence in a wireless communication system. According to the method, a transmission side device transmits a signal using the long sequence comprising a combination of a plurality of sub-subsequences, wherein each of the plurality of sub-subsequences comprises a combination of a plurality of short base sequences, each having a length equal to or shorter than a predetermined length, and sequences obtained by multiplying each of the base sequences by a cover sequence.

10 Claims, 15 Drawing Sheets

Related U.S. Application Data

(60) Provisional application No. 62/244,200, filed on Oct. 21, 2015.

(56) References Cited

U.S. PATENT DOCUMENTS

| | | | |
|---|---|---|---|
| 10,383,041 | B2 | 8/2019 | Chang et al. |
| 2009/0086713 | A1 | 4/2009 | Luo |
| 2013/0229953 | A1 | 9/2013 | Nam et al. |
| 2014/0029602 | A1 | 1/2014 | Han et al. |
| 2014/0064263 | A1 | 3/2014 | Cheng et al. |
| 2015/0215936 | A1 | 7/2015 | Iwai et al. |
| 2016/0044618 | A1* | 2/2016 | Sheng ................. H04W 56/001 370/329 |
| 2017/0264406 | A1 | 9/2017 | Lei et al. |
| 2018/0184390 | A1* | 6/2018 | Wu ................... H04W 56/0005 |
| 2018/0220387 | A1 | 8/2018 | Ji et al. |
| 2018/0309495 | A1 | 10/2018 | Xiong et al. |
| 2018/0309611 | A1 | 10/2018 | Ko et al. |
| 2019/0140689 | A1* | 5/2019 | Wang ................... H04J 11/0073 |
| 2020/0029302 | A1* | 1/2020 | Cox .................. H04W 52/0229 |
| 2020/0275393 | A1* | 8/2020 | Shin .................... H04W 56/001 |

OTHER PUBLICATIONS

United States Patent and Trademark Office U.S. Appl. No. 15/770,128, Office Action dated Sep. 23, 2019, 21 pages.

United States Patent and Trademark Office U.S. Appl. No. 15/770,128, Office Action dated Jan. 23, 2020, 9 pages.

PCT International Application No. PCT/KR2016/011826, Written Opinion of the International Searching Authority dated Jan. 31, 2017, 17 pages.

Qualcomm, "Sequence Design for NB-IOT SYNC Channel", 3GPP TSG RAN WG1 Meeting #82bis, R1-155747, Oct. 2015, 4 pages.

Qualcomm, "Design Principles for NB-IOT SYNC Channel", 3GPP TSG RAN WG1 Meeting #82bis, R1-155746, Oct. 2015, 6 pages.

* cited by examiner (a)

(b)

METHOD FOR TRANSMITTING OR RECEIVING SIGNAL USING LONG SEQUENCE AND APPARATUS THEREFOR

CROSS-REFERENCE TO RELATED APPLICATIONS

This application is a continuation of U.S. patent application Ser. No. 15/770,128, filed on Apr. 20, 2018, now U.S. Pat. No. 10,623,227, which is the National Stage filing under 35 U.S.C. 371 of International Application No. PCT/KR2016/011826, filed on Oct. 20, 2016, which claims the benefit of U.S. Provisional Application No. 62/244,200, filed on Oct. 21, 2015, the contents of which are all hereby incorporated by reference herein in their entirety.

TECHNICAL FIELD

The present invention relates to a method for generating a long sequence based on a short sequence in a wireless communication system and a communication method and apparatus using the same.

BACKGROUND ART

Recently, demand for IoT technology has increased and narrowband IoT (NB-IoT) technology has been discussed in order to support such an IoT service. NB-IoT seeks to provide appropriate throughput between connected apparatuses despite low apparatus complexity and low power consumption.

In 3GPP of the NB-IoT standards, NB-IoT technology capable of being combined with other 3GPP technologies such as GSM, WCDMA or LTE has been studied. To this end, a resource structure which will be used from the viewpoint of a legacy system has been discussed.

FIG. 1 is a diagram illustrating three modes which may be used in NB-IoT.

In order to satisfy the above-described demand, in NB-IoT, a channel bandwidth of 180 kHz is being considered for use both on uplink and downlink, which corresponds to one physical resource block (PRB) in an LTE system.

As shown in FIG. 1, NB-IoT may support three modes such as standalone operation, guard band operation and inband operation. In particular, in the inband mode shown in the lower side of FIG. 1, NB-IoT operation may be performed through a specific narrowband in an LTE channel bandwidth.

In addition, in NB-IoT, using an extended DRX cycle, half-duplex FDD (HD FDD) operation and a single receive antenna in a wireless apparatus substantially reduce power and cost.

DISCLOSURE OF THE INVENTION

Technical Task

To achieve the above-described NB IoT operation, it is required to transmit NB synchronization signals. Specifically, since the NB IoT operation requires a specific narrowband as illustrated in FIG. 1, and thus, there is a need for a method for efficiently transmitting primary synchronization signals (PSSs) and secondary synchronization signals (SSSs).

In some circumstances of the wireless communication system, either the PSS or SSS should represent the entirety of a cell identifier. Therefore, there is an increasing need for a sequence longer than the currently used sequence.

Moreover, when such a long sequence is generated, auto-correlation (autocorrelation) properties need to be researched to facilitate detection of the signal.

Technical Solutions

To achieve these objects and other advantages, in an aspect of the present invention, provided herein is a method for transmitting a narrowband (NB) synchronization signal to at least one user equipment (UE) by an evolved node B (eNB) in a wireless communication system, including: repeating a Zadoff-Chu sequence having a predetermined length on a plurality of orthogonal frequency division multiplexing (OFDM) symbols in a frequency domain and transmitting the repeated Zadoff-Chu sequence as an NB primary synchronization signal (NB PSS); and transmitting an NB secondary synchronization signal (NB SSS) for identifying an NB cell identifier. In this case, the NB PSS may be transmitted in a state in which the Zadoff-Chu sequence is multiplied in each of the plurality of OFDM symbols by each element of a predetermined cover sequence having a length corresponding to the number of the plurality of OFDM symbols.

In another aspect of the present invention, provided herein is a method for receiving a narrowband (NB) synchronization signal from an evolved node B (eNB) by a user equipment (UE) in a wireless communication system, including: receiving an NB primary synchronization signal (NB PSS) generated by repetition of a Zadoff-Chu sequence having a predetermined length on a plurality of orthogonal frequency division multiplexing (OFDM) symbols in a frequency domain; and receiving an NB secondary synchronization signal (NB SSS) for identifying an NB cell identifier. In this case, the NB PSS may be received in a state in which the Zadoff-Chu sequence is multiplied in each of the plurality of OFDM symbols by each element of a predetermined cover sequence having a length corresponding to the number of the plurality of OFDM symbols.

In a further aspect of the present invention, provided herein is an evolved node B (eNB) for transmitting a narrowband (NB) synchronization signal to at least one user equipment (UE) in a wireless communication system, including: a processor configured to generate an NB primary synchronization signal (NB PSS) by repeating a Zadoff-Chu sequence having a predetermined length on a plurality of orthogonal frequency division multiplexing (OFDM) symbols in a frequency domain and generate an NB secondary synchronization signal (NB SSS) for identifying an NB cell identifier; and a transceiver connected to the processor and configured to transmit the NB PSS and the NB SSS to the at least one UE. In this case, the processor may be configured to generate the NB PSS by multiplying, in each of the plurality of OFDM symbols, the Zadoff-Chu sequence and each element of a predetermined cover sequence having a length corresponding to the number of the plurality of OFDM symbols.

In a still further aspect of the present invention, provided herein is a user equipment (UE) for receiving a narrowband (NB) synchronization signal from an evolved node B (eNB) in a wireless communication system, including: a transceiver configured to receive an NB primary synchronization signal (NB PSS) generated by repetition of a Zadoff-Chu sequence having a predetermined length on a plurality of orthogonal frequency division multiplexing (OFDM) symbols in a frequency domain and receive an NB secondary synchronization signal (NB SSS) for identifying an NB cell identifier; and a processor configured to process the NB PSS and the NB SSS received by the transceiver. In this case, the NB PSS may be received in a state in which the Zadoff-Chu sequence is multiplied in each of the plurality of OFDM symbols by each element of a predetermined cover sequence having a length corresponding to the number of the plurality of OFDM symbols.

Advantageous Effects

According to the present invention, it is possible to efficiently transmit synchronization signals for IoT services in the next-generation wireless communication system.

BEST MODE FOR INVENTION

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments through which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form.

As described above, the present invention relates to a method for generating a long sequence by concatenating short base sequences and efficiently transmitting a synchronization signal using the long sequence. First, synchronization signals for NB IoT operation are assumed to transmit such a long-length signal. In addition, since synchronization signals of the LTE system can be reused as the synchronization signals for the NB-IoT operation, the synchronization signals (SSs) of the LTE system will be described in detail before transmission and reception of the NB synchronization signals.

Figure 1:
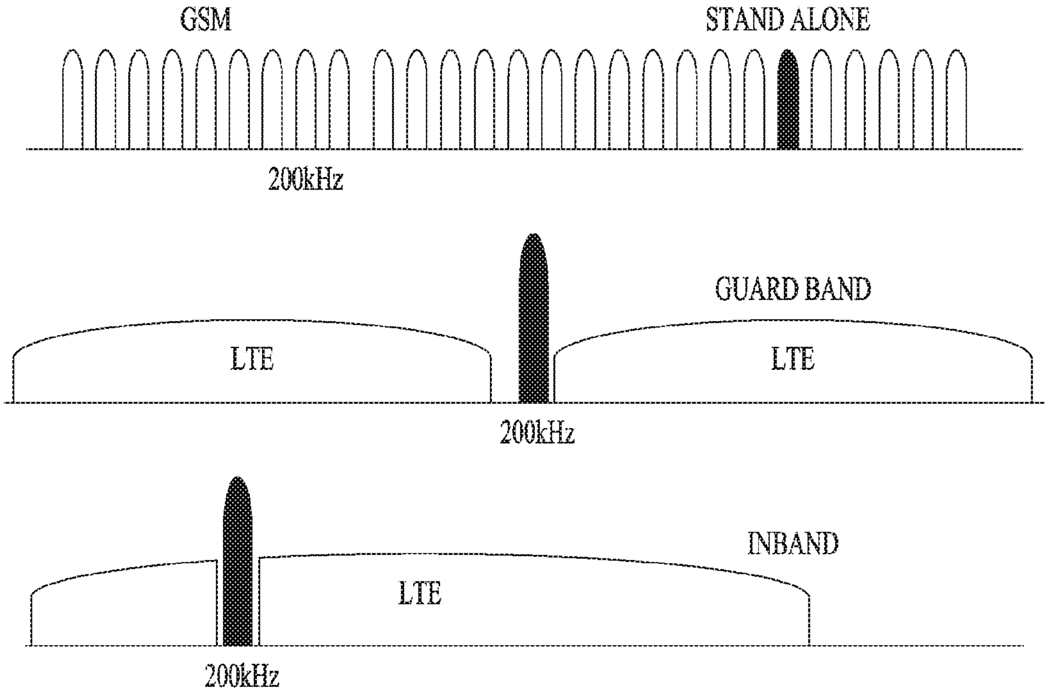
FIG. 1 is a diagram illustrating three modes which may be used in NB-IoT.
Figure 2:
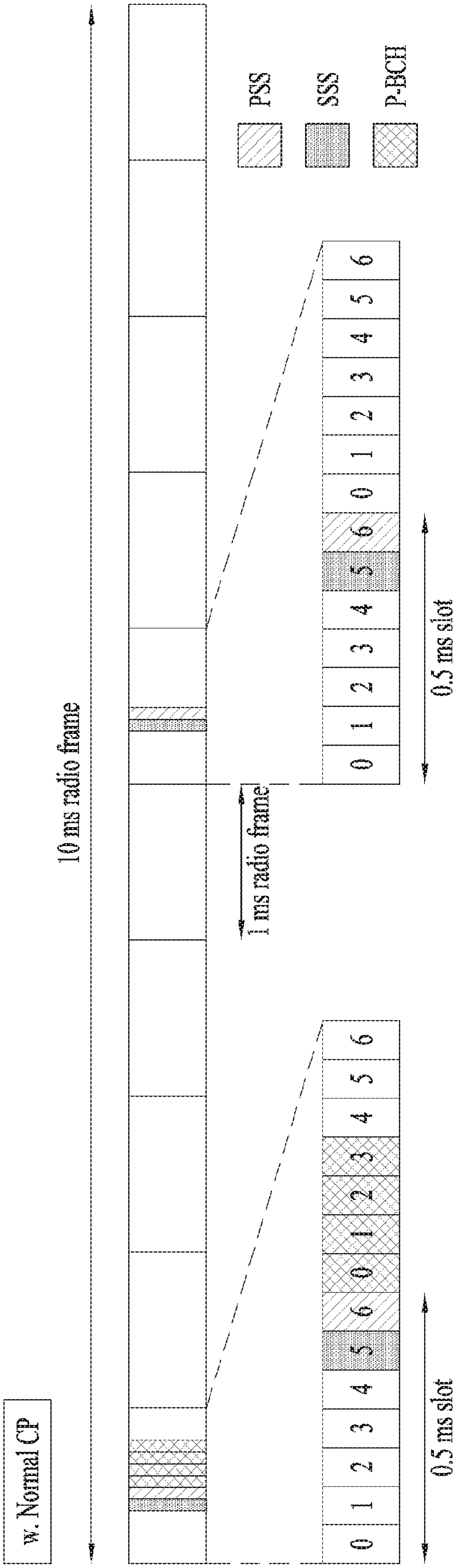
FIGS. 2 and 3 are diagrams showing a method of transmitting synchronization signals in the case of using a normal CP and an extended CP.
Figure 3:
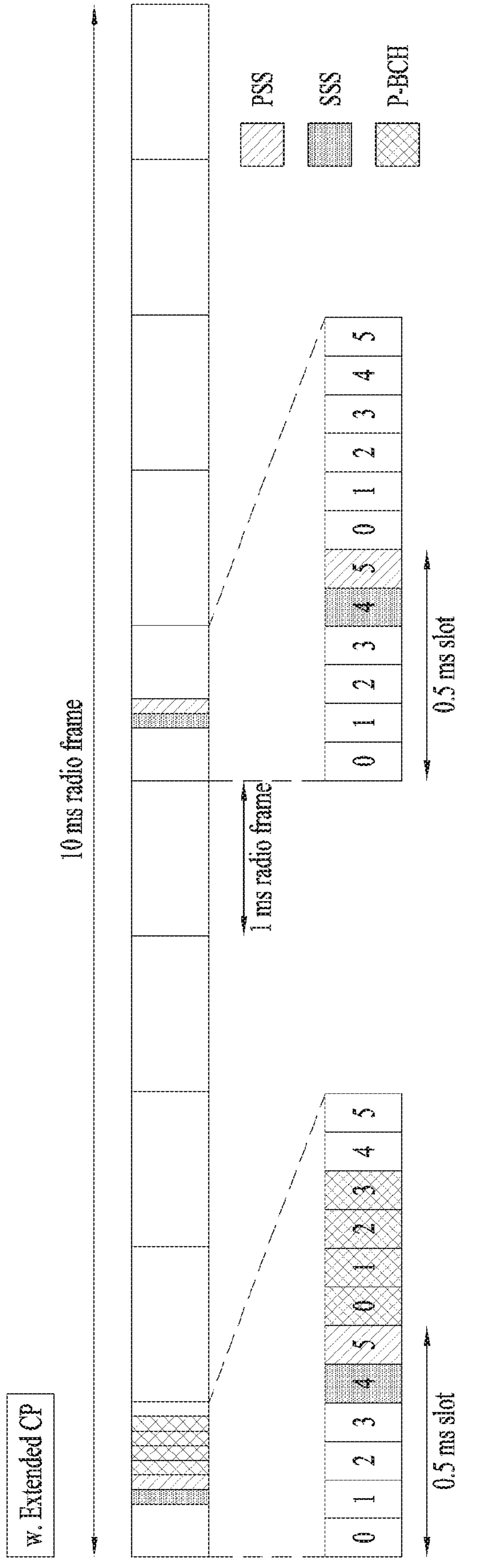

FIGS. 2 and 3 are diagrams showing a method of transmitting synchronization signals in the case of using a normal CP and an extended CP.

The SS includes a PSS and an SSS and is used to perform cell search. FIGS. 2 and 3 show frame structures for transmission of the SSs in systems using a normal CP and an extended CP, respectively. The SS is transmitted in second slots of subframe 0 and subframe 5 in consideration of a GSM frame length of 4.6 ms for ease of inter-RAT measurement and a boundary of the radio frame may be detected via an SSS. The PSS is transmitted in a last OFDM symbol of the slot and the SSS is transmitted in an OFDM symbol located just ahead of the PSS. The SS may transmit a total of 504 physical layer cell IDs via a combination of three PSS and 168 SSSs. In addition, the SS and the PBCH are transmitted in 6 RBs located at the center of the system bandwidth and may be detected or decoded by the UE regardless of transmission bandwidth.

The transmit diversity scheme of the SS uses a single antenna port and is not separately defined in the standard. That is, single antenna transmission or a transmission method (e.g., PVS, TSTD or CDD) transparent to a UE may be used.

Meanwhile, hereinafter, processes of encoding a PSS and an SSS will be described.

In a PSS code, a length-63 Zadoff-Chu (ZC) sequence is defined in the frequency domain and is used as a sequence of a PSS. The ZC sequence is defined by Equation 1 and a sequence element n=31 corresponding to a DC subcarrier is punctured. In Equation 1 below, Nzc=63.

$$d_u(n) = e^{-j\frac{\pi u n(n+1)}{N_{ZC}}} \quad \text{[Equation 1]}$$

The remaining 9 subcarriers of 6 RBs (=72 subcarriers) of the center part are always transmitted with a value of 0 and cause a filter for performing synchronization to be easily designed. In order to define a total of 3 PSSs, in Equation 1, values of u=25, 29 and 34 are used. At this time, 29 and 34 have a conjugate symmetry relation and thus correlations therefor may be simultaneously performed. Conjugate symmetry means a relation of Equation 2 below. Using these properties, a one-shot correlator for u=29 and 34 may be implemented and a total computational load may be reduced by about 33.3%.

$$d_u(n)=(-1)^n(d_{N_{ZC}-u}(n))^*, \text{ when } N_{ZC} \text{ is even number.}$$

$$d_u(n)=(d_{N_{ZC}u}(n)), \text{ when } N_{ZC} \text{ is } odd\text{number.} \quad \text{[Equation 2]}$$

Next, encoding of the SSS will be described.

A sequence used for the SSS is configured by interleaving two length-31 m-sequences and combining the two sequences, and it transmits 168 cell group IDs. The m-sequence used as the sequence of the SSS is robust in a frequency selective environment and a computational load may be reduced by fast m-sequence transformation using Fast Hadamard Transform. In addition, configuration of the SSS using two short codes is proposed in order to reduce the computational load of the UE.

Figure 4:
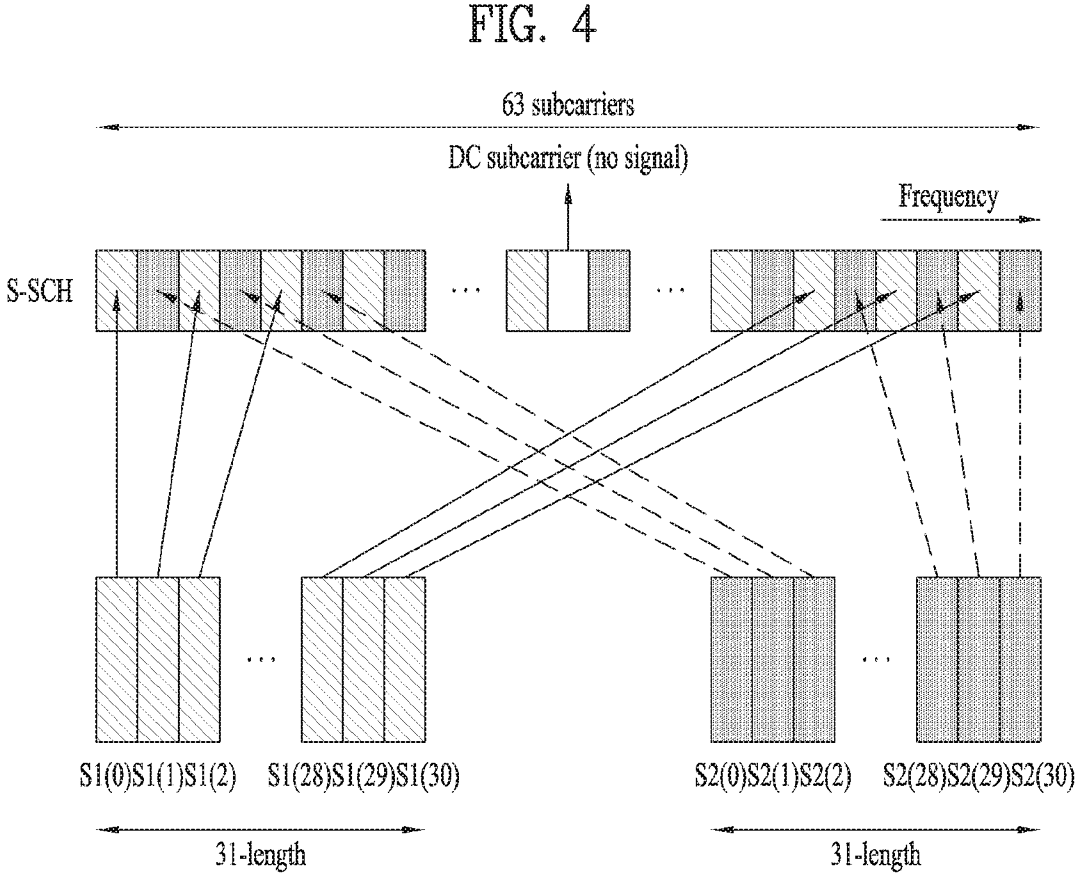
FIG. 4 is a diagram showing two sequences in a logical region interleaved and mapped in a physical region.

FIG. 4 is a diagram showing two sequences in a logical region interleaved and mapped in a physical region.

When the two m-sequences used to generate the SSS code are respectively defined as S1 and S2, if the SSS of subframe 0 transmits a cell group ID using a combination of (S1, S2), the SSS of subframe 5 transmits a cell group ID after swapping (S1, S2) with (S2, S1), thereby identifying a 10-ms frame boundary. At this time, the used SSS code uses a polynomial of $x^5+x^2+1$ and a total of 31 codes may be generated via different circular shifts.

In order to enhance reception performance, two different PSS-based sequences may be defined and scrambled with the SSS and different sequences are scrambled with S1 and S2. Thereafter, an S1-based scrambling code is defined to perform scrambling with S2. At this time, the code of the SSS is swapped in units of 5 ms, but the PSS-based scrambling code is not swapped. The PSS-based scrambling code is defined in six cyclic shift versions according to the PSS index in the m-sequence generated from the polynomial of $x^5+x^3+1$ and the S1-based scrambling code is defined in eight cyclic shift versions according to the index of S1 in the m-sequence generated from the polynomial of $x^5+x^4+x^2+x^1+1$.

Cell search in NB-IoT or NB-LTE which is a model obtained by applying NB-IoT to an LTE system is the same as the above-described LTE system. A used sequence needs to be modified according to NB-LTE properties and, hereinafter, portions to be modified as compared to the LTE system will be focused upon.

Figure 5:
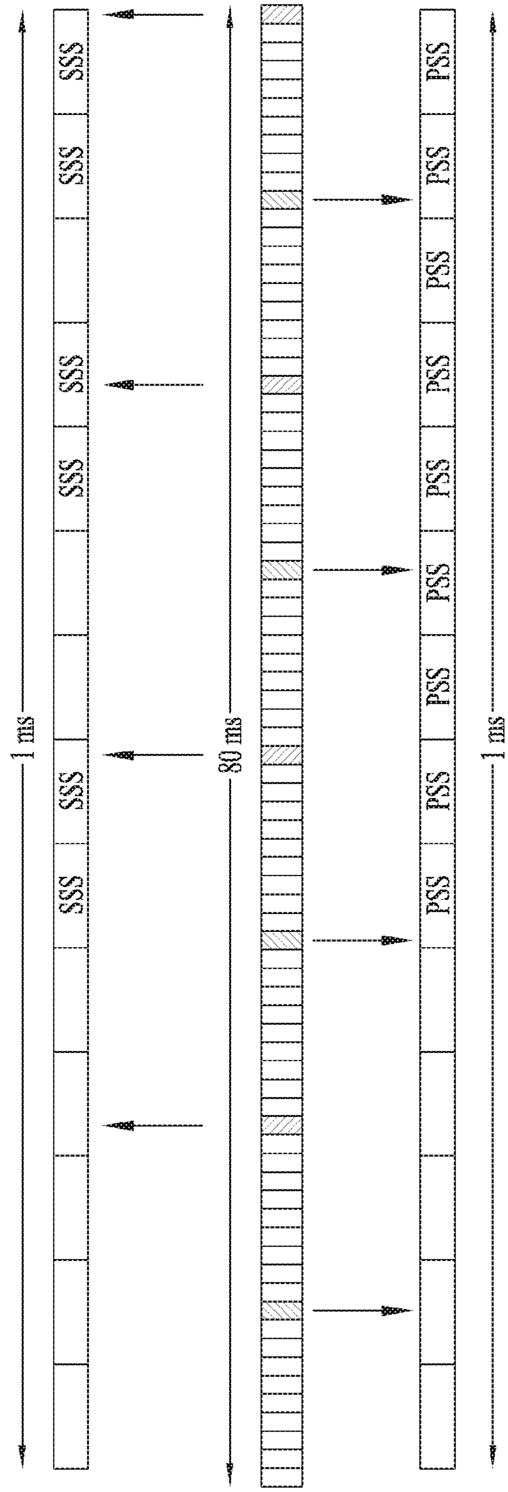
FIG. 5 is a diagram showing the overall structure in which synchronization signals are transmitted and received in an NB LTE system.

FIG. 5 is a diagram showing the overall structure in which synchronization signals are transmitted and received in an NB LTE system.

As shown in FIG. 5, even in the NB-LTE system, a PSS and an SSS are divided and transmitted and are respectively referred to as NB-PSS and NB-SSS in order to be distinguished from the legacy PSS and SSS. However, a PSS and an SSS may be used if such use will not lead to confusion.

Even in the NB-LTE system, similarly to the legacy LTE system, 504 NB cell identities through a synchronization channel need to be indicated. In the NB-LTE system according to the embodiment of the present invention, the NB-PSS is transmitted using one specific sequence. Therefore, the 504 NB cell identities need to be indicated using the NB-SSS only.

In a receiving device, auto-correlation is generally performed to detect the PSS. To this end, the receiving device attempts to detect the PSS using a sliding window method in the time domain. The method of detecting the PSS may increase complexity of the receiving device and thus may not be suitable for the NB-LTE system for decreasing complexity. Since the NB-PSS according to the present embodiment is transmitted using one specific sequence, the receiving device may perform only operation for detecting the specific sequence, thereby reducing complexity. For example, if a Zadoff-Chu (ZC) sequence is used for the NB-PSS, the root index of this ZC sequence may be fixed to one predetermined value (e.g., u=5). Since the NB-PSS is simply configured, the NB-SSS needs to be used to efficiently indicate the 504 cell identities, which will be described below as another aspect of the present invention.

In one embodiment of the present invention, the NB-PSS may be repeatedly transmitted in a plurality of OFDM symbols. Although the NB-PSS is repeatedly transmitted in nine OFDM symbols in the example of FIG. 5, the number of OFDM symbols is not limited thereto. Since one subframe using an extended CP may include 12 OFDM symbols and the first three OFDM symbols of the 12 OFDM symbols may be used to transmit a PDCCH, the NB-PSS is repeatedly transmitted in the nine OFDM symbols in the example of FIG. 5. The above-described numerical values may be changed according to change in the number of OFDM symbols included in one subframe of the NB-LTE system and a maximum number of OFDM symbols required to transmit the PDCCH. For example, if the number of OFDM symbols included in one subframe is 14 and a maximum number of OFDM symbols used to transmit a PDCCH is 3, the number of OFDM symbols in which the NB-PSS is repeatedly transmitted may be 11. In the present embodiment, the NB-PSS may be repeatedly transmitted in a plurality of OFDM symbols which is continuously arranged in the time domain.

If the NB-PSS corresponds to resource elements for transmitting a CRS in an LTE system for providing an NB-LTE service upon mapping to resource elements in the time-frequency domain, the NB-PSS element may be punctured to prevent collision. That is, the transmission position of the NB-PSS/NB-SSS may be designed to avoid collision with legacy LTE signals such as a PDCCH, a PCFICH, a PHICH and an MBSFN.

As the NB-PSS is repeatedly transmitted in the plurality of OFDM symbols, the receiving device may easily determine a subframe timing and a frequency offset.

Meanwhile, it is also desirable that the NB-SSS is transmitted in a plurality of OFDM symbols as shown in FIG. 5. However, since the NB-SSS should be able to identify the entirety of a cell identifier as described above, the present invention proposes a method for generating a long sequence and transmitting the long sequence using a plurality of OFDM symbols. Although FIG. 5 shows that the NB-SSS is transmitted in six OFDM symbols, the present invention is not limited thereto. For example, the NB-SSS may be transmitted in eleven OFDM symbols like the above-described NB-PSS.

Method for Generating a Long Sequence

Hereinafter, a description will be given of a method for improving auto-correlation performance when a long-length sequence is generated by concatenating existing short-length base sequences. In this case, the auto-correlation properties may vary according to the arrangement order of the short-length base sequences and how the short-length base sequences are combined with a code cover. The following embodiments are designed such that in the auto-correlation, the second highest peak value is equal to or smaller than ⅛ of the highest peak (that is, a different therebetween should be equal to or greater than 9 dB).

For example, by combining length-10 binary Golay sequences a(n) and b(n), it is possible to generate the following sequence S and sequence Sc, each having a total length of 80.

$$a(n){:}\ (1, 1, -1, 1, -1, 1, -1, -1, 1, 1)$$

$$b(n){:}\ (1, 1, -1, 1, 1, 1, 1, 1, -1, -1)$$

$$\text{Sequence } S{:}\ (an, an, an, an, -an, -an, -an, -an)$$

$$\text{Sequence } Sc{:}\ (an, an, bn, -bn, an, -an, bn, bn) \qquad \text{Equation 3}$$

Of course, other arbitrary sequences can be used instead of the binary Golay sequence.

To generate the sequence S, the base sequence a(n) is repeated eight times. In addition, different code covers are applied to the first four base sequences (first four ans) and the last four base sequences (last four ans) of the sequence S with the total length of 80. To generate the sequence Sc, the base sequences a(n) and b(n) are repeated four times, respectively and then cover codes are applied. Hereinafter, the auto-correlation of the two sequences will be described.

Figure 6:
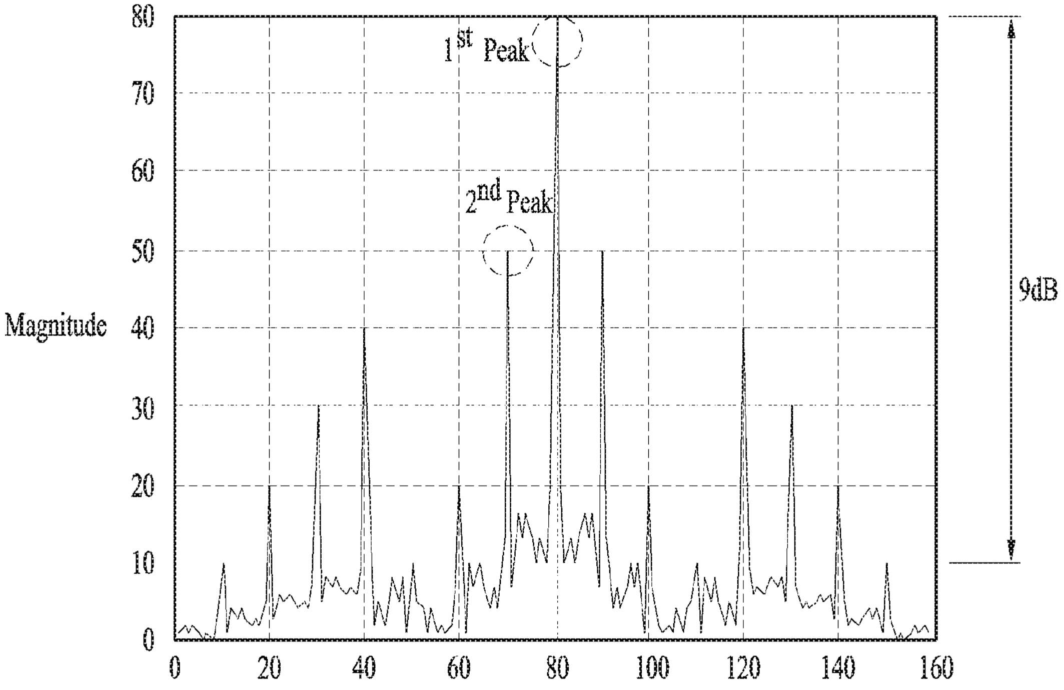
FIG. 6 is a diagram illustrating the result of auto-correlation of sequence S in Equation 3.

FIG. 6 is a diagram illustrating the result of auto-correlation of the sequence S in Equation 3. Specifically, FIG. 6 shows the auto-correlation result of the length-80 sequence S.

Referring to FIG. 6, it can be seen that when the auto-correlation of the sequence S is performed, many spikes with various sizes are generated, and particularly, a difference between the largest spike and the second largest spike is equal to or smaller than 3 dB. The reason for why the spikes are repeatedly generated is that in a specific case, the code covers applied to the sequence S create opposite phases so that offset synthesis is induced, but in many cases, the code covers create spikes because complementary synthesis is induced. Table 1 below shows cases where spikes occur.

TABLE 1

| Sequence | an | an | an | An | — an | — an | — an | — an | Inner Product Result |
|---|---|---|---|---|---|---|---|---|---|
| 0 sample shifted | an | an | an | An | — an | — an | −an | — an | 80 (10 + 10 + 10 + 10 + 10 + 10 + 10 + 10) |
| 10 samples shifted | an | an | An | an | — | — an | −an | — an | 50 (10 + 10 + 10 − 10 + 10 + 10 + 10) |
| 20 samples shifted | | an | An | an | an | — | an | — an | 20 (10 + 10 − 10 − 10 + 10 + 10) |
| 30 samples shifted | | | | An | an | an | An | — an | −10 (10 − 10 − 10 − 10 + 10) |
| 40 samples shifted | | | | | an | an | An | an | −40 (−10 − 10 − 10 − 10) |
| 50 samples shifted | | | | | | an | An | an | −30 (−10 − 10 − 10) |
| 60 samples shifted | | | | | | | An | an | −20 (−10 − 10) |
| 70 samples shifted | | | | | | | | an | −10 (−10) |

In Table 1, $an \cdot an^H = 10$.

Meanwhile, in the case of the sequence which causes the above-described auto-correlation results, that is, when the difference between the largest spike and second largest spike is small or when many spikes occur, it may not be used for signal detection in a multipath environment because errors occur frequently during the signal detection Therefore, when short-length base sequences are concatenated to generate a long-length sequence, a method for guaranteeing good auto-correlation properties needs to be devised.

Figure 7:
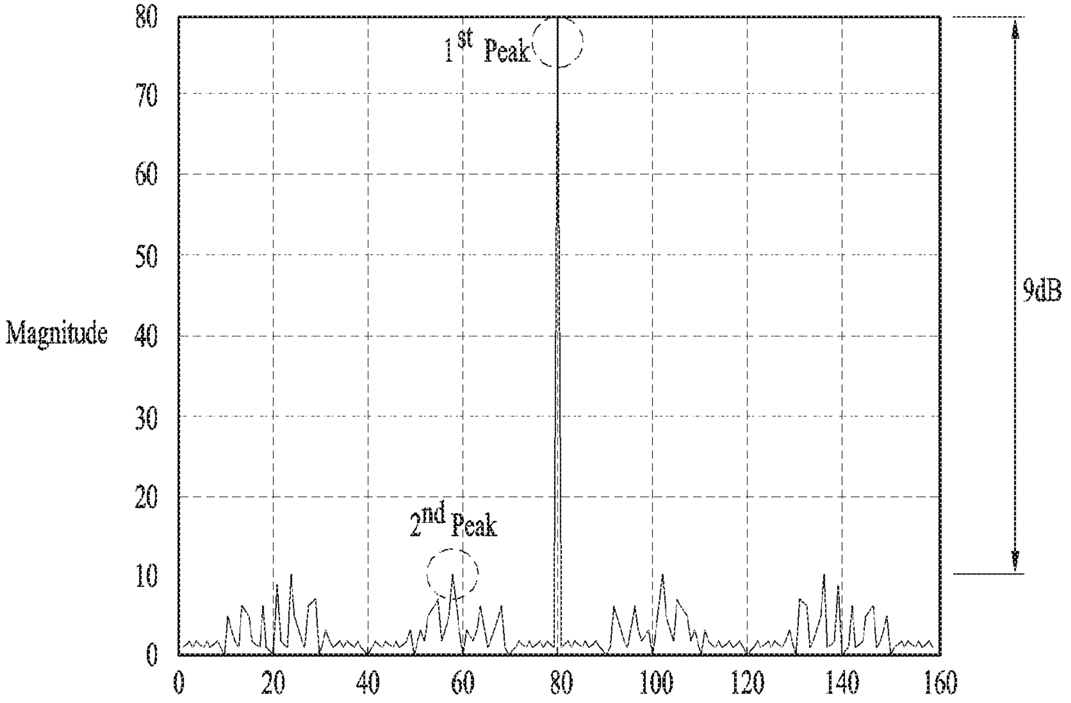
FIG. 7 is a diagram illustrating the result of auto-correlation of sequence Ss in Equation 3.

FIG. 7 is a diagram illustrating the result of auto-correlation of the sequence Ss in Equation 3.

Referring to FIG. 7, it can be seen that when the auto-correlation of the sequence Sc is performed, a different between the largest spike and the second largest spike is equal to or greater than 8 dB.

It is possible to configure various lengths of sequences through combinations of base sequences and code covers, and more particularly, the sequence may have different auto-correlation properties according to how the base sequences and code covers are combined. Hereinafter, a description will be given of a sequence concatenation method for allowing a long-length sequence to have good auto-correlation properties when the long-length sequence is generated by concatenating short-length base sequences.

Figure 8:
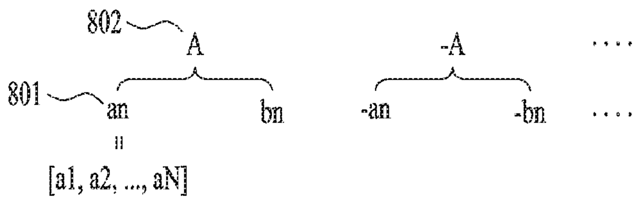
FIG. 8 is a diagram illustrating a method for generating a long sequence with good auto-correlation properties according to an embodiment of the present invention.

FIG. 8 is a diagram illustrating a method for generating a long sequence with good auto-correlation properties according to an embodiment of the present invention.

First, it is assumed in the present embodiment that M N-length base sequences (801) are combined to configure a sub-sequence (802). Although FIG. 8 shows that sub-sequence A (802) includes two base sequences an and bn for convenience of description, the present invention is not limited thereto.

Meanwhile, a new sub-sequence can be generated by applying a code covers to the base sequences (an and bn) constituting the sub-sequence (802). FIG. 8 shows that a cover sequence [−1, −1] is multiplied with [an, bn] constituting the sub-sequence A in order to generate sub-sequence −A. However, the present invention is not limited thereto, and cover sequences can be applied in various ways to generate sub-sequences.

Thereafter, the final sequence can be generated by selecting and arranging L sub-sequences from the generated sub-sequence set. In this case, it is desirable to configure the sub-sequence combination such that the final sequence can satisfy the following requirements.

When the auto-correlation is calculated based on a sliding window, it is desirable to configure a sequence queue such that the multiplication result of the base sequences has a different phase if the inner product is applied to some elements of the sub-sequence and the multiplication result of the base sequences has the same phase if the inner product is applied to all elements.

In addition, '+/−1', '+/−j', etc. can be used as the cover code. Various sequences such as complementary Golay sequence, Zadoff-Chu sequence, M-sequence, etc. can be used as the base sequence, but for convenience of description, the following explanation will be made on the assumption that the complementary Golay sequence is used.

For example, a sub-sequence can be constructed using length-N base sequences an and bn. Specifically, to construct the sub-sequence, two base sequences are concatenated and an orthogonal code cover is applied to the concatenated two base sequences.

By doing so, sub-sequences A=[an an], B=[bn bn], C=[an bn], and D=[bn an] are constructed. If the code cover is introduced, new sub-sequences Ac=[an−an], Bc=[bn−bn], Cc=[an−bn], and Dc=[bn−an] can be generated.

To simplify calculation, the inner product of an and bn can be defined as shown in Equation 4.

$$an \cdot an^H = bn \cdot bn^H = 1$$

$$an \cdot bn^H = bn \cdot an^H = 0 \quad \text{[Equation 4]}$$

The inner product of A=[an an],B=[bn bn], C=[an bn], and D=[bn an] can be expressed as shown in Equation 5.

$$A \cdot A^H = an \cdot an^H + an \cdot an^H = 2$$

$$B \cdot B^H = bn \cdot bn^H + bn \cdot bn^H = 2$$

$$C \cdot C^H = an \cdot an^H + bn \cdot bn^H = 2$$

$$D \cdot D^H = bn \cdot bn^H + an \cdot an^H = 2 \quad \text{[Equation 5]}$$

In this case, the sub-sequences Ac and Bc, the sub-sequences A and B, the sub-sequences Cc and Dc, and the sub-sequences C and D, which are generated by the introduction of the code cover according to the definition, are respectively orthogonal to each other.

$$A \cdot A_C^H = an \cdot an^H - an \cdot an^H = 0$$

$$A \cdot B_C^{Hc}\ bn^H - an \cdot bn^H = 0$$

$$B \cdot A_C^H = bn \cdot an^H - bn \cdot an^H = 0$$

$$B \cdot B_C^H = bn \cdot bn^H - bn \cdot bn^H = 0$$

$$C \cdot C_C^H = an \cdot an^H - bn \cdot bn^H = 0$$

$$C \cdot D_C^H = an \cdot bn^H - bn \cdot an^H = 0$$

$$D \cdot C_C^H = bn \cdot an^H - an \cdot bn^H = 0$$

$$C \cdot D_C^H = bn \cdot bn^H - an \cdot an^H = 0 \quad \text{[Equation 6]}$$

On the contrary, the sub-sequences Ac and Bc, the sub-sequences C and D, the sub-sequences Cc and Dc, and the sub-sequences A and B are not orthogonal to each other.

$$A \cdot C_C^H = an \cdot an^H - an \cdot bn^H = 1$$

$$A \cdot D_C^H = an \cdot bn^H - an \cdot an^H = -1$$

$$B \cdot C_C^H = bn \cdot an^H - bn \cdot bn^H = -1$$

$$B \cdot D_C^H = bn \cdot bn^H - bn \cdot an^H = 1$$

$$C \cdot A_C^H = an \cdot an^H - bn \cdot an^H = 1$$

$$C \cdot B_C^H = an \cdot bn^H - bn \cdot bn^H = -1$$

$$D \cdot A_C^H = bn \cdot an^H - an \cdot an^H = -1$$

$$D \cdot B_C^H = bn \cdot bn^H - an \cdot bn^H = 1 \quad \text{[Equation 7]}$$

According to the present embodiment, it is possible to divide the sub-sequences into sub-sequence set 1 (A, B, Ac, Bc) and sub-sequence set2 (C, D, Cc, Dc), select sub-sequences from each set, and then properly arrange the selected sub-sequences. By doing so, the final sequence can be generated as described in the following embodiments.

Embodiment 1—A Case in Which Set 1 is Used (1) A Configuration Method using Two Sub-Sequences A random sub-sequence is selected as the first sub-sequence, and a sub-sequence different from the first sub-sequence can be selected as the second sub-sequence. The priority for selecting the second sub-sequence from among candidates is as follows.

Priority 1. A sub-sequence having an OCC and a base sequence different from those of the first sub-sequence is selected.

Priority 2. A sub-sequence having an OCC different from that of the first sub-sequence and the same base sequence as that of the first sub-sequence is selected.

Priority 3. A sub-sequence with the same OCC as that of the first sub-sequence and a base sequence different from that of the first sub-sequence is selected.

Table 2 below shows an example of using two sub-sequences as described above.

TABLE 2

| Sub-sequence arrangement | Sequence | Auto-correlation result |
|---|---|---|
| A Bc | (an an bn −bn) | 0 0 0 4 |
| A Ac | (an an an −an) | 1 0 1 4 |
| A B | (an an bn bn) | 0 0 2 4 |

(2) A Configuration Method using Four Sub-Sequences

It is preferable to select the third sub-sequence from among the remaining sub-sequences, which are not selected in the previous process, according to the following priority.

Priority 1. A sub-sequence having an OCC different from that of the first sub-sequence and the same element as that of the first sub-sequence is selected.

Priority 2. A sub-sequence having an OCC and an element different from those of the first sub-sequence is selected.

Priority 3. A sub-sequence having the same OCC as that of the first sub-sequence and an element different from that of the first sub-sequence is selected.

Table 3 below shows an example of using three sub-sequences as described above.

TABLE 3

| Sub-sequence arrangement | Sequence | Auto-correlation result |
|---|---|---|
| A Bc Ac | (an an bn −bn an −an) | 1 0 1 0 1 6 |
| A Bc B | (an an bn −bn bn bn) | 0 0 1 0 0 6 |
| A Ac Bc | (an an an −an bn −bn) | 0 0 1 0 1 6 |
| A Ac B | (an an an −an bn bn) | 0 0 1 0 2 6 |
| A B Ac | (an an bn bn an −an) | 1 0 1 0 1 6 |
| A B Bc | (an an bn bn bn −bn) | 0 0 1 0 2 6 |

In the present embodiment, the remaining sub-sequence which is not selected in the previous process can be configured as the fourth sub-sequence.

Table 4 below shows an example of using four sub-sequences as described above.

TABLE 4

| Sub-sequence arrangement | Sequence | Auto-correlation result |
|---|---|---|
| A Bc Ac B | (an an bn −bn an −an bn bn) | 0 0 0 0 0 0 0 8 |
| A Bc B Ac | (an an bn −bn bn bn an −an) | 1 0 1 0 1 0 1 8 |
| A Ac Bc B | (an an an −an bn −bn bn bn) | 0 0 0 0 0 0 0 8 |
| A Ac B Bc | (an an an −an bn bn bn −bn) | 0 0 0 0 2 0 2 8 |
| A B Ac Bc | (an an bn bn an −an bn −bn) | 0 0 2 0 2 0 0 8 |
| A B Bc Ac | (an an bn bn bn −bn an −an) | 1 0 1 0 1 0 1 8 |

(3) A Configuration Method using Eight Sub-Sequences

The previously selected sub-sequences can be used one more time. In this case, it is preferable to configure a sub-sequence queue such that the pattern made by the first four sub-sequences is not repeated.

For example, if the sub-sequence queue is (A Ac Bc B), the sub-sequences needs to be selected and arranged such that the pattern made by two, three, or four sub-sequences does not include (A Ac), (Ac Bc), (Bc B), (A Ac Bc), (Ac Bc B), or (A Ac Bc B).

The fifth sub-sequence is selected according to the following priority.

Priority 1. The fourth sub-sequence is selected.

→This is advantageous in that even if the sub-sequence queue is made by selecting any sub-sequences and concatenating the selected one after the fourth sub-sequence, the sub-sequence queue can have a pattern different from that made by the four sub-sequences.

Priority 2. A sub-sequence with an OCC different from that of the fourth sub-sequence is selected.

Tables 5 to 7 below shows three examples of using 8 sub-sequences. In Tables 5 to 7, 'x' indicates a sequence with poor auto-correlation properties, and 'o' indicates a sequence with good auto-correlation properties, that is, a sequence suitable for use.

TABLE 5

| | # of base sequence | Index | Sub-sequence arrangement | | # of base sequence | Index | Sub-sequence arrangement |
|---|---|---|---|---|---|---|---|
| | 4 | S1 | A Ac | | 4 | S1 | A Ac |
| | 6 | | A Ac B | | 6 | | A Ac Bc |
| x | 8 | S11 | A Ac B Bc | o | 8 | S12 | A Ac Bc B |
| x | 12 | S111 | A Ac B Bc A Ac | x | 12 | S121 | A Ac Bc B A Ac |
| x | 16 | S1111 | A Ac B Bc A Ac B Bc | x | 16 | S1211 | A Ac Bc B A Ac B Bc |
| x | 16 | S1112 | A Ac B Bc A Ac Bc B | x | 16 | S1212 | A Ac Bc B A A cBc B |
| o | 12 | S112 | A Ac B Bc A B | x | 12 | S122 | A Ac Bc B A B |
| x | 16 | S1121 | A Ac B Bc A B Ac Bc | x | 16 | S1221 | A Ac Bc B A B Ac Bc |
| x | 16 | S1122 | A Ac B Bc A B Bc Ac | x | 16 | S1222 | A Ac Bc B A B Bc Ac |
| o | 12 | S113 | A Ac B Bc A Bc | o | 12 | S123 | A Ac Bc B A Bc |
| x | 16 | S1131 | A Ac B Bc A Bc Ac B | x | 16 | S1231 | A Ac Bc B A Bc Ac B |
| x | 16 | S1132 | A Ac B Bc A Bc B Ac | x | 16 | S1232 | A Ac Bc B A Bc B Ac |
| o | 12 | S114 | A Ac B Bc Ac A | o | 12 | S124 | A Ac Bc B Ac A |
| x | 16 | S1141 | A Ac B Bc Ac A B Bc | x | 16 | S1241 | A Ac Bc B Ac A B Bc |
| x | 16 | S1142 | A Ac B Bc Ac A Bc B | x | 16 | S1242 | A Ac Bc B Ac A Bc B |
| x | 12 | S115 | A Ac B Bc Ac B | o | 12 | S125 | A Ac Bc B Ac B |
| x | 16 | S11S1 | A Ac B Bc Ac B A Bc | x | 16 | S12S1 | A Ac Bc B Ac B A Bc |
| x | 16 | S1152 | A Ac B Bc Ac B Bc A | o | 16 | S1252 | A Ac Bc B Ac B Bc A |
| o | 12 | S116 | A Ac B Bc Ac Bc | x | 12 | S126 | A Ac Bc B Ac Bc |
| x | 16 | S1161 | A Ac B Bc Ac Bc A B | x | 16 | S1261 | A Ac Bc B Ac Bc A B |
| o | 16 | S1162 | A Ac B Bc Ac Bc B A | x | 16 | S1262 | A Ac Bc B Ac Bc B A |
| o | 12 | S117 | A Ac B Bc B A | o | 12 | S127 | A Ac Bc B B A |
| x | 16 | S1171 | A Ac B Bc B A Ac Bc | x | 16 | S1271 | A Ac Bc B B A Ac Bc |
| o | 16 | S1172 | A Ac B Bc B A Bc Ac | o | 16 | S1272 | A Ac Bc B B A Bc Ac |
| o | 12 | S118 | A Ac B Bc B Ac | o | 12 | S128 | A Ac Bc B B Ac |
| x | 16 | S1181 | A Ac B Bc B Ac A Bc | o | 16 | S1281 | A Ac Bc B B Ac A Bc |
| o | 16 | S1182 | A Ac B Bc B Ac Bc A | x | 16 | S1282 | A Ac Bc B B Ac Bc A |
| x | 12 | S119 | A Ac B Bc B Bc | o | 12 | S129 | A Ac Bc B B Bc |
| x | 16 | S1191 | A Ac B Bc B Bc A Ac | x | 16 | S1291 | A Ac Bc B B Bc A Ac |
| x | 16 | S1192 | A Ac B Bc B Bc Ac A | o | 16 | S1292 | A Ac Bc B B Bc Ac A |
| o | 12 | S11a | A Ac B Bc Bc A | o | 12 | S12a | A Ac Bc B Bc A |
| x | 16 | S11a1 | A Ac B Bc Bc A Ac B | x | 16 | S12a1 | A Ac Bc B Bc A Ac B |
| o | 16 | S11a2 | A Ac B Bc Bc A B Ac | o | 16 | S12a2 | A Ac Bc B Bc A B Ac |
| o | 12 | S11b | A Ac B Bc Bc Ac | o | 12 | S12b | A Ac Bc B Bc Ac |
| o | 16 | S11b1 | A Ac B Bc Bc Ac A B | x | 16 | S12b1 | A A cBc B Bc Ac A B |
| x | 16 | S11b2 | A Ac B Bc Bc Ac B A | x | 16 | S12b2 | A Ac Bc B Bc Ac B A |
| o | 12 | S11c | A Ac B Bc Bc B | x | 12 | S12c | A Ac Bc B Bc B |
| x | 16 | S11d | A Ac B Bc Bc B A Ac | x | 16 | Sl2c1 | A Ac Bc B Bc B A Ac |
| o | 16 | S11c2 | A Ac B Bc Bc B Ac A | x | 16 | S12c2 | A Ac Bc B Bc B Ac A |

TABLE 6

| | # of base sequence | Index | Sub-sequence arrangement | | # of base sequence | Index | Sub-sequence arrangement |
|---|---|---|---|---|---|---|---|
| | 4 | S2 | A B | | 4 | S2 | A B |
| o | 6 | | A B Ac | O | 6 | | A B Bc |
| x | 8 | S21 | A B Ac Bc | O | 8 | S22 | A B Bc Ac |
| O | 12 | S211 | A B Ac Bc A Ac | O | 12 | S221 | A B Bc Ac A Ac |

TABLE 6-continued

| # of base sequence | | | Index | Sub-sequence arrangement | # of base sequence | | | Index | Sub-sequence arrangement |
|---|---|---|---|---|---|---|---|---|---|
| X | | 16 | S2111 | A B Ac Bc A Ac B Bc | X | | 16 | S2211 | A B Bc Ac A Ac B Bc |
| X | | 16 | S2112 | A B Ac Bc A Ac Bc B | X | | 16 | S2212 | A B Bc Ac A Ac Bc B |
| X | 12 | | S212 | A B Ac Bc A B | X | 12 | | S222 | A B Bc Ac A B |
| X | | 16 | S2121 | A B Ac Bc A B Ac Bc | X | | 16 | S2221 | A B Bc Ac A B Ac Bc |
| X | | 16 | S2122 | A B Ac Bc A B Bc Ac | X | | 16 | S2222 | A B Bc Ac A B Bc Ac |
| O | 12 | | S213 | A B Ac Bc A Bc | O | 12 | | S223 | A B Bc Ac A Bc |
| X | | 16 | S2131 | A B Ac Bc A Bc Ac B | X | | 16 | S2231 | A B Bc Ac A Bc Ac B |
| X | | 16 | S2132 | A B Ac Bc A Bc B Ac | X | | 16 | S2232 | A B Bc Ac A Bc B Ac |
| X | 12 | | S214 | A B Ac Bc Ac A | O | 12 | | S224 | A B Bc Ac Ac A |
| X | | 16 | S2141 | A B Ac Bc Ac A B Bc | X | | 16 | S2241 | A B Bc Ac Ac A B Bc |
| X | | 16 | S2142 | A B Ac Bc A cA Bc A | O | | 16 | S2242 | A B Bc Ac Ac A Bc B |
| O | 12 | | S215 | A B Ac Bc Ac B | O | 12 | | S225 | A B Bc Ac Ac Bc B |
| X | | 16 | S21S1 | A B Ac Bc Ac B A Bc | O | | 16 | S2251 | A B Bc Ac Ac B A Bc |
| X | | 16 | S2152 | A B Ac Bc Ac B Bc A | X | | 16 | S2252 | A B Bc Ac Ac B Bc A |
| X | 12 | | S216 | A B Ac Bc Ac Bc | O | 12 | | S226 | A B Bc Ac Ac Bc |
| X | | 16 | S2162 | A B Ac Bc Ac Bc A B | X | | 16 | S2261 | A B Bc Ac Ac Bc A |
| X | | 16 | S2162 | A B Ac Bc Ac Bc B A | O | | 16 | S2262 | A B Bc Ac Ac Bc B A |
| O | 12 | | S217 | A B Ac Bc B A | X | 12 | | S227 | A B Bc Ac B A |
| X | | 16 | S2171 | A B Ac Bc B A Ac Bc | X | | 16 | S2271 | A B Bc Ac B A Ac Bc |
| X | | 16 | S2172 | A B Ac Bc B A Bc Ac | X | | 16 | S2272 | A B Bc Ac B A Bc Ac |
| X | 12 | | S218 | A B Ac Bc B Ac | O | 12 | | S228 | A B Bc Ac B Ac |
| X | | 16 | S2181 | A B Ac Bc B Ac A Bc | O | | 16 | S2281 | A B Bc Ac B Ac A Bc |
| X | | 16 | S2182 | A B Ac Bc B Ac Bc A | O | | 16 | S2282 | A B Bc Ac B Ac Bc A |
| O | 12 | | S219 | A B Ac Bc B Bc | X | 12 | | S229 | A B Bc Ac B Bc |
| O | | 16 | S2191 | A B Ac Bc B Bc A Ac | X | | 16 | S2291 | A B Bc Ac B Bc A Ac |
| O | | 16 | S2192 | A B Ac Bc B Bc Ac A | X | | 16 | S2292 | A B Bc Ac B Bc Ac A |
| O | 12 | | S21a | A B Ac Bc Bc A | O | 12 | | S22a | A B Bc Ac Bc A |
| O | | 16 | S21a1 | A B Ac Bc Bc A Ac B | X | | 16 | S22a1 | A B Bc Ac Bc A Ac B |
| X | | 16 | S21a2 | A B Ac Bc Bc A B Ac | X | | 16 | S22a2 | A B Bc Ac Bc A B Ac |
| O | 12 | | S21b | A B Ac Bc Bc Ac | X | 12 | | S22b | A B Bc Ac Bc Ac |
| X | | 16 | S21b1 | A B Ac Bc Bc Ac A B | X | | 16 | S22b1 | A B Bc Ac Bc Ac A B |
| O | | 16 | S21b2 | A B Ac Bc Bc Ac B A | X | | 16 | S22b2 | A B Bc Ac Bc Ac B A |
| O | 12 | | S21c | A B Ac Bc Bc B | O | 12 | | S22c | A B Bc Ac Bc B |
| O | | 16 | S21c1 | A B Ac Bc Bc B A Ac | X | | 16 | S22c1 | A B Bc Ac Bc B A Ac |
| X | | 16 | S21c2 | A B Ac Bc Bc B Ac A | O | | 16 | S22c2 | A B Bc Ac Bc B Ac A |

TABLE 7

| # of base sequence | | | | | Index | Sub-sequence arrangement | # of base sequence | | | | | Index | Sub-sequence arrangement |
|---|---|---|---|---|---|---|---|---|---|---|---|---|---|
| 4 | | | | | S3 | A Bc | 4 | | | | | S3 | A Bc |
| O | 6 | | | | | A Bc Ac | O | 6 | | | | S32_6 | A Bc B |
| O | | 8 | | | S31 | A Bc Ac B | O | | 8 | | | S32 | A Bc B Ac |
| O | | | 12 | | S311 | A Bc Ac B A Ac | O | | | 12 | | S321 | A Bc B Ac A Ac |
| X | | | | 16 | S3111 | A Bc Ac B A Ac B Bc | X | | | | 16 | S3211 | A Bc B Ac A Ac B Bc |
| X | | | | 16 | S3112 | A Bc Ac B A Ac Bc B | X | | | | 16 | S3212 | A Bc B Ac A Ac Bc B |
| O | | | 12 | | S312 | A Bc Ac B A B | O | | | 12 | | S322 | A Bc B Ac A B |
| X | | | | 16 | S3121 | A Bc Ac B A B Ac Bc | X | | | | 16 | S3221 | A Bc B Ac A B Ac Bc |
| X | | | | 16 | S3122 | A Bc Ac B A B Bc Ac | X | | | | 16 | S3222 | A Bc B Ac A B Bc Ac |
| X | | | 12 | | S313 | A Bc Ac B A Bc | X | | | 12 | | S323 | A Bc B Ac A Bc |
| X | | | | | | | X | | | | 16 | S3231 | A Bc B Ac A Bc Ac B |
| X | | | | | | | X | | | | 16 | S3232 | A Bc B Ac A Bc B Ac |
| O | | | 12 | | S314 | A Bc Ac B Ac A | O | | | 12 | | S324 | A Bc B Ac Ac A |
| X | | | | 16 | S3141 | A Bc Ac B Ac A B Bc | O | | | | 16 | S3241 | A Bc B Ac Ac A B Bc |
| X | | | | 16 | S3142 | A Bc Ac B Ac A Bc B | X | | | | 16 | S3242 | A Bc B Ac Ac A Bc B |
| X | | | 12 | | S315 | A Bc Ac B Ac B | O | | | 12 | | S325 | A Bc B Ac Ac B |
| X | | | | | | | X | | | | 16 | S3251 | A Bc B Ac Ac B A Bc |
| X | | | | | | | O | | | | 16 | S3252 | A Bc B Ac Ac B Bc A |
| O | | | 12 | | S316 | A Bc Ac B Ac Bc | O | | | 12 | | S326 | A Bc B Ac Ac Bc |
| X | | | | 16 | S3161 | A Bc Ac B Ac Bc A B | O | | | | 16 | S3261 | A Bc B Ac Ac Bc A B |
| X | | | | 16 | S3162 | A Bc Ac B Ac Bc B A | X | | | | 16 | S3262 | A Bc B Ac Ac Bc B A |
| O | | | 12 | | S317 | A Bc Ac B B A | O | | | 12 | | S327 | A Bc B Ac B A |
| O | | | | 16 | S3171 | A Bc Ac B B A Ac Bc | O | | | | 16 | S3271 | A Bc B Ac B A Ac Bc |
| X | | | | 16 | S3271 | A Bc Ac B B A Bc Ac | X | | | | 16 | S3272 | A Bc B Ac B A Bc Ac |
| O | | | 12 | | S318 | A Bc Ac B B Ac | X | | | 12 | | S328 | A Bc B Ac B Ac |
| X | | | | 16 | S3181 | A Bc Ac B B Ac A Bc | X | | | | 16 | S3281 | A Bc B Ac B Ac A Bc |
| O | | | | 16 | S3182 | A Bc Ac B B Ac Bc A | X | | | | 16 | S3282 | A Bc B Ac B Ac Bc A |
| O | | | 12 | | S319 | A Bc Ac B B Bc | O | | | 12 | | S329 | A Bc B Ac B Bc |
| O | | | | 16 | S3191 | A Bc Ac B B Bc A Ac | X | | | | 16 | S3291 | A Bc B Ac B Bc A Ac |
| X | | | | 16 | S13192 | A Bc Ac B B Bc Ac A | X | | | | 16 | S3292 | A Bc B Ac B Bc Ac A |
| O | | | 12 | | S31a | A Bc Ac B Bc A | O | | | 12 | | S32a | A Bc B Ac Bc A |
| X | | | | 16 | S31a1 | A Bc Ac B Bc A B Ac | X | | | | 16 | S32a1 | A Bc B Ac Bc A B Ac |

TABLE 7-continued

| | # of base sequence | Index | Sub-sequence arrangement | | # of base sequence | Index | Sub-sequence arrangement |
|---|---|---|---|---|---|---|---|
| X | 16 | S31a2 | A Bc Ac B Bc A Ac B | X | 16 | S32a2 | A Bc B Ac Bc A Ac B |
| X | 12 | S31b | A Bc Ac B Bc Ac | O | 12 | S32b | A Bc B Ac Bc Ac |
| X | 16 | S31b1 | A Bc Ac B Bc Ac A B | X | 16 | S32b1 | A Bc B Ac Bc Ac A B |
| X | 16 | S31b2 | A Bc Ac B Bc Ac B A | O | 16 | S32b2 | A Bc B Ac Bc Ac B A |
| O | 12 | S31c | A Bc Ac B Bc B | O | 12 | S32c | A Bc B Ac Bc B |
| O | 16 | S31c1 | A Bc Ac B Bc B A Ac | X | 16 | S32c1 | A Bc B Ac Bc B A Ac |
| O | 16 | S31c2 | A Bc Ac B Bc B Ac A | O | 16 | S32c2 | A Bc B Ac Bc B Ac A |

In the case of a length-N sequence, a part of the sequence, specifically, a portion with a length of L, may be used depending on situations. Sequences with good auto-correlation properties regardless of lengths are listed in the following description.

Table 8 below shows sequences, each consisting of six or eight sub-sequences on the basis of (A Ac Bc B).

TABLE 8

| |
|---|
| S1252 = [A Ac Bc B Ac B Bc A] |
| S1272 = [A Ac Bc B B A Bc Ac] |
| S1281 = [A Ac Bc B B Ac A Bc] |
| S1292 = [A Ac Bc B B Bc Ac A] |
| S12a2 = [A Ac Bc B Bc A B Ac] |
| S123 = [A Ac Bc B A Bc] |
| S124 = [A Ac Bc B Ac A] |
| S12b = [A Ac Bc B Bc Ac] |

Table 9 below shows sequences, each consisting of six or eight sub-sequences on the basis of (A B Bc Ac).

TABLE 9

| |
|---|
| S2242 = [A B Bc Ac Ac A Bc B] |
| S2251 = [A B Bc Ac Ac B A Bc] |
| S2262 = [A B Bc Ac Ac Bc B A] |
| S2281 = [A B Bc Ac B Ac A Bc] |
| S2282 = [A B Bc Ac B Ac Bc A] |
| S22c2 = [A B Bc Ac Bc B Ac A] |
| S221 = [A B Bc Ac A Ac] |
| S223 = [A B Bc Ac A Bc] |
| S22a = [A B Bc Ac Bc A] |

Table 10 below shows sequences, each consisting of six or eight sub-sequences on the basis of (A Bc Ac B).

TABLE 10

| |
|---|
| S3171 = [A Bc Ac B B A Ac Bc] |
| S3182 = [A Bc Ac B B Ac Bc A] |
| S3191 = [A Bc Ac B B Bc A Ac] |
| S31c1 = [A Bc Ac B Bc B A Ac] |
| S31c2 = [A Bc Ac B Bc B Ac A] |
| S311 = [A Bc Ac B A Ac] |
| S312 = [A Bc Ac B A B] |
| S314 = [A Bc Ac B Ac A] |
| S316 = [A Bc Ac B Ac Bc] |
| S31a = [A Bc Ac B Bc A] |

Table 11 below shows sequences, each consisting of six or eight sub-sequences on the basis of (A Bc B Ac).

TABLE 11

| |
|---|
| S3241 = [A Bc B Ac Ac A B Bc] |
| S3252 = [A Bc B Ac Ac B Bc A] |
| S3261 = [A Bc B Ac Ac Bc A B] |
| S3271 = [A Bc B Ac B A Ac Bc] |
| S32b2 = [A Bc B Ac Bc Ac B A] |
| S321 = [A Bc B Ac A Ac] |
| S322 = [A Bc B Ac A B] |
| S329 = [A Bc B Ac B Bc] |
| S32a = [A Bc B Ac Bc A] |

The above sequences consisting of six or eight sub-sequences on the basis of the four sub-sequences, for example, (A Ac Bc B), (A B Bc Ac), (A Bc Ac B), or (A Bc B Ac) show good auto-correlation properties even if only L elements are used.

Embodiment 2—A Case in which Set 2 is Used

Similar to embodiment 1, in this embodiment, configuration methods can be defined as follows according to the number of sub-sequences constituting a long-length sequence.

(1) A Configuration Method using Two Sub-Sequences

A random sub-sequence is selected as the first sub-sequence, and a sub-sequence different from the first sub-sequence can be selected as the second sub-sequence. The priority for selecting the second sub-sequence from among candidates is as follows.

Priority 1. A sub-sequence having an OCC different from that of the first sub-sequence and the same base sequence arrangement as that of the first sub-sequence is selected.

Priority 2. A sub-sequence having an OCC and a base sequence arrangement different from those of the first sub-sequence is selected.

Priority 3. A sub-sequence with the same OCC as that of the first sub-sequence and a base sequence arrangement different from that of the first sub-sequence is selected.

Table 12 below shows an example of using two sub-sequences.

TABLE 12

| Sub-sequence arrangement | Sequence | Auto-correlation result |
|---|---|---|
| C Cc | (an bn an −bn) | 0 0 0 4 |
| C Dc | (an bn bn −an) | 1 0 1 4 |
| C D | (an bn bn an) | 1 0 1 4 |

(2) A Configuration Method using Four Sub-Sequences

The third sub-sequence can be selected from among the remaining sub-sequences, which are not selected in the previous process, according to the following priority.

Priority 1. A sub-sequence having the same OCC and base sequence arrangement as those of the first sub-sequence is selected.

Priority 2. A sub-sequence having an OCC and a base sequence arrangement different from those of the first sub-sequence is selected.

Priority 3. A sub-sequence having an OCC different from that of the first sub-sequence and the same base sequence arrangement as that of the first sub-sequence is selected.

Table 13 below shows an example of using three sub-sequences.

TABLE 13

| Sub-sequence arrangement | Sequence | Auto-correlation result |
|---|---|---|
| C Cc Dc | (an bn an −bn bn −an) | 1 0 0 0 1 6 |
| C Cc D | (an bn an −bn bn an) | 1 0 2 0 1 6 |
| C Dc Cc | (an bn bn −an an bn) | 0 2 0 0 0 6 |
| C Dc D | (an bn bn −an bn an) | 1 0 0 0 1 6 |
| C D Cc | (an bn bn an an −bn) | 0 0 0 0 2 6 |
| C D Dc | (an bn bn an bn −an) | 1 0 2 0 1 6 |

In this case, the remaining sub-sequence which is not selected in the previous process can be configured as the fourth sub-sequence.

TABLE 14

| Sub-sequence arrangement | Sequence | Auto-correlation result |
|---|---|---|
| C Cc Dc D | (an bn an −bn bn −an bn an) | 1 0 1 0 1 0 1 8 |
| C Cc D Dc | (an bn an −bn bn an bn −an) | 1 0 1 0 1 0 1 8 |
| C Dc Cc D | (an bn bn −an an −bn bn an) | 1 0 1 0 1 0 1 8 |
| C Dc D Cc | (an bn bn −an bn an an −bn) | 0 0 0 0 2 0 2 8 |
| C D Cc Dc | (an bn bn an an −bn bn −an) | 1 0 1 0 1 0 0 8 |
| C D Dc Cc | (an bn bn an bn −an an −bn) | 0 0 2 0 2 0 0 8 |

(3) A Configuration Method using Eight Sub-Sequences

The configuration method using up to eight sub-sequences according to the aforementioned principles is as follows.

<Example of using Five Sub-Sequences>

S1=[C Cc D Dc Cc]; O
S2=[C Cc D Dc D]; O
S3=[C D Cc Dc Cc];
S4=[C D Cc Dc D];
S5=[C Cc D Dc A]; O
S6=[C Cc D Dc mB]; O
S7=[C D Cc Dc A];
S8=[C D Cc mB mB];

<Example of using Six Sub-Sequences>

S1=[A mA B mB A mA];
S2=[A mA B mB mA A]; O
S3=[A mA B mB A B];
S4=[A mA B mB A mB]; O
S5=[A mA B mB A A];
S6=[A mA B mB mA mA]; O
S7=[A mA B mB mA B];
S8=[A mA B mB mA mB];
S9=[A mA B mB B A]; O
S10=[A mA B mB B mA]; O
S11=[A mA B mB B B];
S12=[A mA B mB B mB];
S13=[A mA B mB mB A];
S14=[A mA B mB mB mA]; O
S15=[A mA B mB mB B]; O
S16=[A mA B mB mB mB];
S17=[A B mA mB AB];
S18=[A B mA mB A mB]; O
S19=[A B mA mB mA B];
S20=[A B mA mB mA mB]; O
S21=[A B mA mB A A];
S22=[A B mA mB A mA]; O
S23=[A B mA mB mA A];
S24=[A B mA mB mA mA];
S25=[A B mA mB B A];
S26=[A B mA mB B mA];
S27=[A B mA mB B B]; O
S28=[A B mA mB B mB];
S29=[A B mA mB mB A]; O
S30=[A B mA mB mB mA];
S31=[A B mA mB mB B]; O
S32=[A B mA mB mB mB];

Hereinafter, a case where the above-described long-length sequence is used for NB IoT synchronization signals will be described.

Application to NB-IoT

As described above, NB-IoT has system bandwidth (BW) corresponding to one PRB of the LTE system and supports low complexity and low power consumption. To this end, this may be mainly used as a communication system for implementing IoT by supporting a machine-type communication (MTC) device in a cellular system. Since the NB-LTE system use the same OFDM parameters including subcarrier spacing as in the conventional LTE system, one PRB in the legacy LTE band is allocated for the NB-LTE without allocation of additional bands. That is, the NB-LTE system has advantages in that frequencies can be efficiently used.

Hereinafter, a method of transmitting an NB-PSS and an NB-SSS will be described in detail based on the above description.

NB-PSS Transmission

Figure 9:
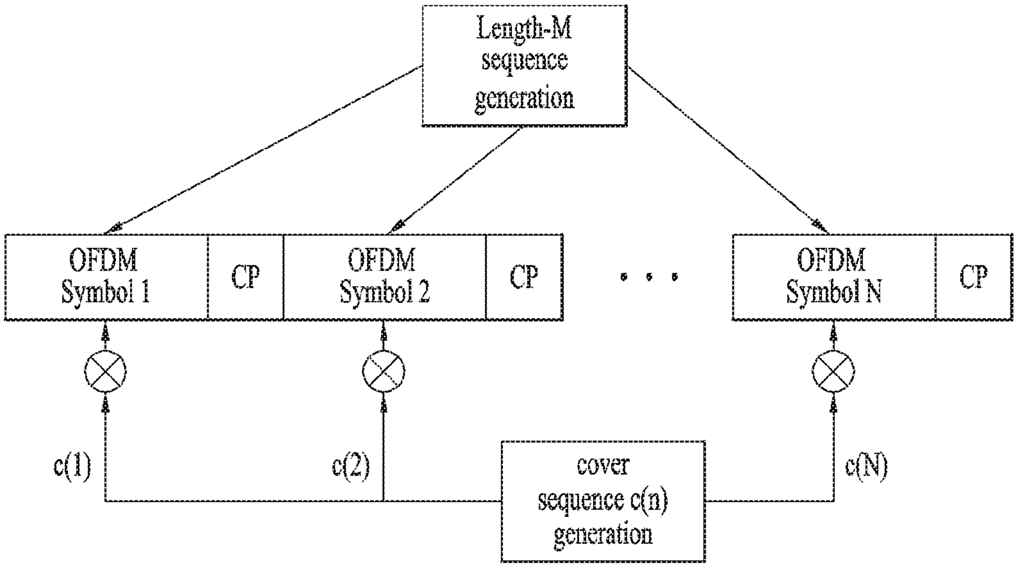
FIG. 9 is a diagram illustrating in detail a method for transmitting an NB-PSS by repetition in a plurality of OFDM symbols.

FIG. 9 is a diagram illustrating in detail a method for transmitting an NB-PSS through repetition in a plurality of OFDM symbols.

As described above, the NB-PSS is transmitted using a plurality of OFDM symbols. At this time, it is proposed that the same sequence is repeatedly transmitted in the OFDM symbols, and each OFDM symbol is multiplied by a specific cover sequence as shown in FIG. 9.

Assuming that the system bandwidth is one PRB and subcarrier spacing is 15 kHz, the maximum length of a sequence which may be transmitted in one OFDM symbol is 12. For convenience of description, it is assumed that the system bandwidth of the NB-LTE system is on PRB and the subcarrier spacing is 15 kHz.

The PSS is generally detected by a receiver in the time domain in consideration of computational complexity. In the PSS, in order to acquire time/frequency synchronization, a sliding window is applied to a PSS sequence to perform correlation. In the PSS transmission structure shown in FIG. 9, since the same sequence is transmitted in every OFDM symbol, a relatively large correlation value can be obtained in a period corresponding to the OFDM symbol length. If the condition of a complementary Golay sequence is used, the period during which the relatively large correlation value is outputted can be increased, thereby improving correlation properties.

In addition, if the cover sequence is applied to every OFDM symbol as shown in FIG. 9, the correlation properties can be further improved. To transmit the PSS using a complementary Golay sequence, the following methods can be used.

Method 1: A method of alternately arranging a pair of complementary Golay sequences in OFDM symbols.

For example, assuming that N=6 OFDM symbols, a(n) is transmitted in OFDM symbol 1 and b(n) is transmitted in OFDM symbol 2. In this case, c(n) can be applied by taking length-6 of a length-7 m-sequence. At this time, it is preferable that the number of OFDM symbols for transmitting the PSS is an even number. If it is assumed that complementary Golay sequences are binary sequences, a possible sequence length is $2^a 10^b 26^c$ (where each of a, b and c is an integer equal to or greater than 0). If one OFDM symbol has twelve available resources, the possible Golay sequence length may be 10. For example, a pair of length-10 complement Golay sequences is a(n)=[1 1 −1 −1 1 1 1 −1 1 −1] and b(n)=[1 1 1 1 1 −1 1 −1 −1 1]. In addition, the REs of the OFDM symbols, where the sequence is not allocated, are filled with 0 and then transmitted. If a non-binary complementary Golay sequence is assumed, since a sequence pair is present without length limit, a pair of length-12 sequences a(n) and b(n) may be transmitted in the OFDM symbols in the same manner.

Figure 10:
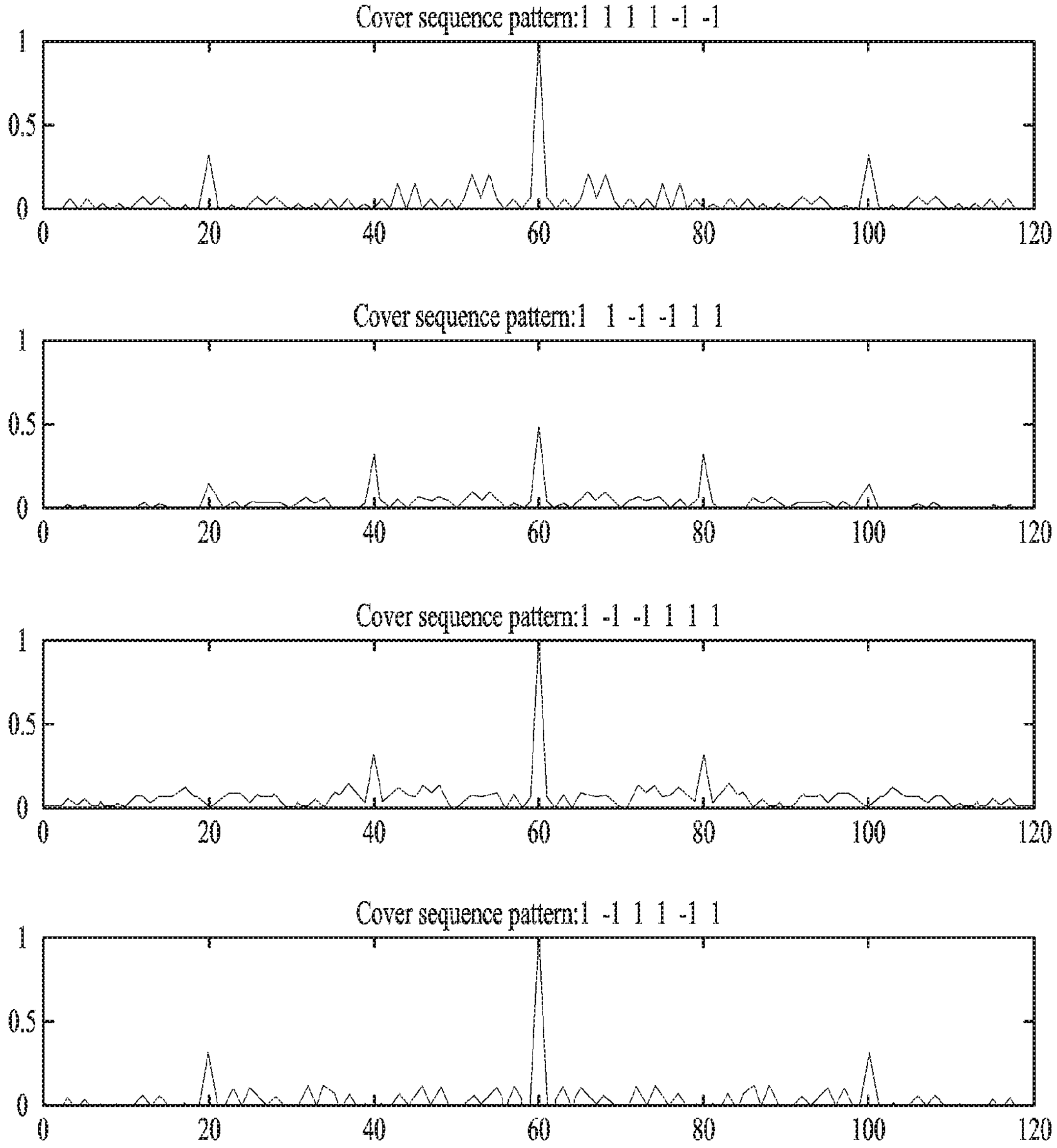
FIG. 10 is a diagram illustrating correlation properties of a pair of length-10 complementary sequences a(n) and b(n) and various c(n) patterns.

FIG. 10 is a diagram illustrating correlation properties of a pair of length-10 complementary sequences a(n) and b(n) and various c(n) patterns.

As another method, if the PSS is transmitted in an odd number of OFDM symbols, the PSS may be transmitted such that one sequence of the sequence pair is transmitted once more. For example, in the case of N=7 OFDM symbols, the sequences may be arranged in the following order: a(n) b(n) a(n) b(n) a(n) b(n) a(n) and then transmitted in the OFDM symbols.

Method 2: A method of arranging a pair of complementary Golay sequences in one OFDM symbol.

Method 2-1: A method of generating and arranging a sequence corresponding to ½ of one OFDM symbol.

For example, assuming that N=6 OFDM symbols, length-6 non-binary complementary Golay sequences a(n) and b(n) are generated, a(n) is allocated to half of available REs in one OFDM symbol, and b(n) is allocated to the remaining half. In this case, the RE allocation may be performed such that a(n) is allocated first to the first half and b(n) is allocated to the remaining half.

Method 2-2: A method of superpositioning and transmitting a(n) and b(n) in one OFDM symbol.

For example, assuming that N=6 OFDM symbols, it is possible to generate length-10/12 binary/non-binary complementary Golay sequences and calculate a(n)+b(n) for transmission thereof.

Method 3: A method of arranging and transmitting L (L>2) or more complementary Golay sequences.

In this case, the number of OFDM symbols for transmitting the PSS should satisfy the requirement of multiples of L. For example, in the case of L=3 and N=6, the length-10 or length-12 complementary Golay sequences la(n), lb(n), lc(n) can be sequentially arranged and transmitted in the OFDM symbols. That is, the sequences are arranged in the following order: la(n), lb(n), lc(n), la(n), lb(n), lc(n) and then transmitted after applying a cover sequence c(n).

Meanwhile, in the above-described NB-PSS transmission method, a ZC sequence having elements corresponding in number to 12 subcarriers may be used in the frequency domain of one OFDM symbol. In this case, only 11 subcarriers can be used to prevent the NB-PSS from being mapped to a DC element. Therefore, a length-11 ZC sequence may be used.

As a particular example of the above-described NB-PSS transmission method, it is possible to generate the sequence di(n) of the NB-PSS using the length-11 ZC sequence in the frequency domain as shown in Equation 8.

$$d_l(n) = S(l) \cdot e^{-j\frac{\pi u n(n+1)}{11}},\ n = 0, 1, \ldots, 10 \quad \text{[Equation 8]}$$

In Equation 8, it is preferable to specify the root index u of the ZC sequence as a specific root index as described above. Although the present embodiment assumes that u=5, the invention is not limited thereto.

In addition, in Equation 8, s(1) denotes the above-described cover sequence, and S(1) can be defined according to the OFDM symbol index '1' as shown in Table 15.

TABLE 15

| Cyclic prefix length | S(3), . . . , S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

NB-SSS Transmission

Since the NB-PSS is transmitted using one specific sequence as described above, it is required to represent 504 NB cell identities using the NB-SSS. Therefore, a method for transmitting the NB-SSS in a plurality of OFDM symbols similar to the NB-PSS and mapping a long sequence to the plurality of OFDM symbols in order to distinguish between the cell identities is proposed.

Figure 11:
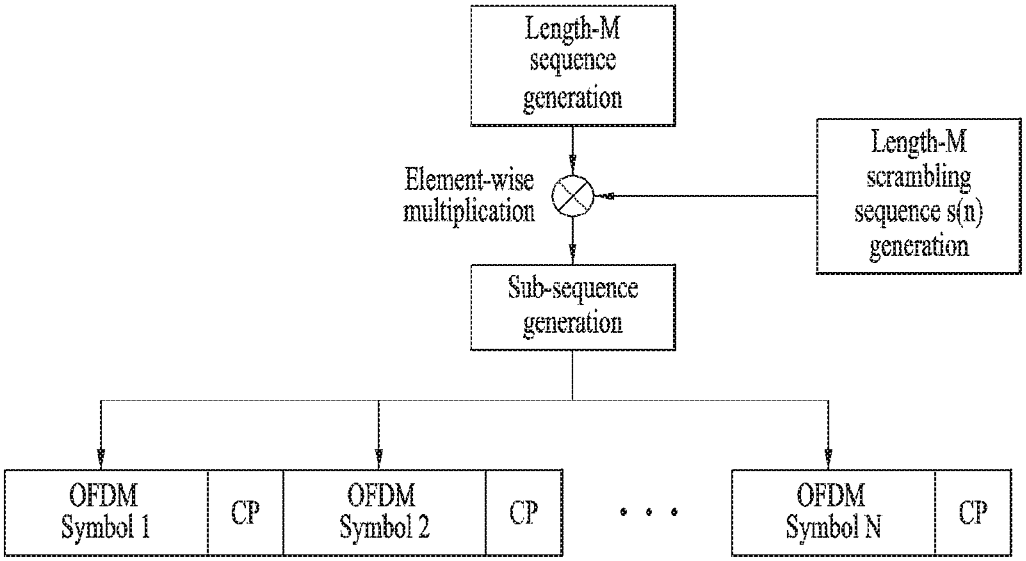
FIG. 11 is a diagram illustrating the concept of NB-SSS transmission according to an embodiment of the present invention.

FIG. 11 is a diagram illustrating the concept of NB-SSS transmission according to an embodiment of the present invention.

By detecting an SSS, a receiving device, that is, UE, may obtain information on cell id detection, information on the index of a subframe carrying the SSS, and other system information. To transmit the SSS, it is preferable to use a long length-M sequence over a plurality of OFDM symbols as shown in FIG. 11, instead of repeatedly performing transmission using a plurality of OFDM symbols similar to the above-described PSS.

Thus, a long-length sequence to be used for the NB-SSS may be configured by a combination of sub-sequences selected in consideration of auto-correlation properties.

Referring to FIG. 11, a length-M sequence can be generated and then multiplied by a length-M scrambling sequence in each element. Specifically, the length-M sequence is divided into length-L (M>=L) sequences, the length-L sequences are mapped to N OFDM symbols, and then a scrambling sequence s(n) is applied. By doing so, the length-M sequence is transmitted in the N OFDM symbols. For example, assuming that M=72, L=12 and N=6, a length-72 sequence is divided into six length-12 sequences, and the length-12 sequences are respectively transmitted in six OFDM symbols. The above-described numerical values are exemplary, and the values may be changed as long as M=L*N is satisfied.

In this case, an SSS sequence can be designed as follows to transmit corresponding information.

In the legacy LTE system, 504 physical cell IDs are indicated by a PSS and an SSS. On the other hand, in the NB-IoT system, 504 physical cell IDs are indicated by an NB-SSS. In the legacy LTE system, a PBCH is transmitted every 10 ms, and a PSS/SSS is transmitted every 5 ms. That is, the PSS/SSS is transmitted twice during the PBCH transmission period. Thus, an SSS transmission subframe number needs to be indicated by the SSS, and to indicate the subframe index, SSS1 and SSS2 consisting of the SSS are swapped according to subframe positions. Considering that in the NB-IoT system, an NB-PBCH is transmitted with a period of 80 ms and the NB-PSS is transmitted with a period of 10 ms, the NB-SSS can be designed to be transmitted with a period longer than that of the NB-PSS (e.g., 20 ms or 40 ms). If the NB-SSS transmission period is designed to be shorter than the NB-PBCH transmission period, i.e., 80 ms, the number of candidate positions capable of transmitting the NB-SSS during the NB-PBCH transmission period may be greater than that of the LTE system In summary, the NB-SSS should include a significantly large amount of information including not only a cell-ID but also an NB-SSS frame index. Therefore, the NB-SSS capable of simplifying reception complexity of a UE while containing a large amount of information needs to be designed.

To this end, in addition to the method of transmitting a long sequence in a plurality of OFDM symbols as described with reference to FIG. 11, it is proposed in an embodiment of the present invention to configure the NB-SSS using combinations of multiple sequences.

Specifically, the NB-SSS may be configured by combining a base-sequence, a scrambling sequence, a cyclic shift and a cover sequence. For example, a base-sequence may be generated using an L-length ZC sequence, and then element-wise multiplication may be applied to an L-length scrambling sequence. Thereafter, a cyclic shift is performed, and then element-wise multiplication is applied after generation of an L-length cover sequence.

Figure 12:
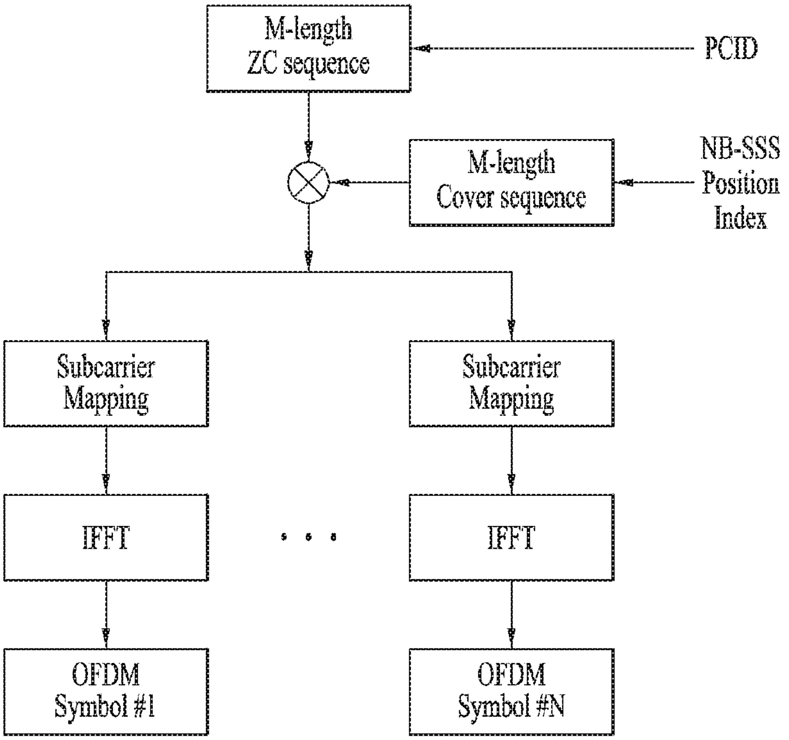
FIG. 12 is a diagram illustrating a method for generating and transmitting an NB-SSS according to an embodiment of the present invention.

FIG. 12 is a diagram illustrating a method for generating and transmitting an NB-SSS according to an embodiment of the present invention.

Referring to FIG. 12, a length-M ZC sequence can be generated first.

$$Szc(u, n) = e^{j\frac{\pi u n(n+1)}{M}}, \text{ where,} \quad \text{[Equation 9]}$$

$u$: root index, $n$: sequence index

It is assumed that this ZC sequence is long enough to transmit the NB-SSS in a plurality of OFDM symbols as described above. In the present embodiment, M=132 (12 subcarriers*11 OFDM symbols). Here, eleven OFDM symbols may be obtained by subtracting three OFDM symbols, in which a PDCCH can be transmitted, from fourteen OFDM symbols included in one subframe, as described above regarding the NB-PSS. However, the number of OFDM symbols may vary according to system implementation.

As well known to the public, in the case of a ZC sequence, root indices can be identified when the sequence length is a prime number. Therefore, as described above, it is preferable to use 131, which is the largest prime number less than 132, as the ZC sequence length rather than a length-132 ZC sequence and then cyclically extend a length-131 ZC sequence to a length-132 ZC sequence as shown in Equation 10.

$$Szc(u, n) = e^{j\frac{\pi u n'(n'+1)}{M}}, \quad \text{[Equation 10]}$$

where $u$: root index, $n = 0, 1, \ldots, M$ $n' = n \bmod M$

Since the NB-LTE system uses one specific sequence as the NB-PSS as described above, 504 cell IDs need to be identified by the NB-SSS, and thus the length-131 ZC sequence is insufficient to indicate the 504 cell IDs.

To this end, in an embodiment of the present invention, it is proposed that as shown in FIG. 12, the ZC sequence is multiplied by a length-M cover sequence in each element and this cover sequence is configured to indicate a predetermined number of offsets or position indices so that the resultant NB-SSS indicates all cell IDs. For example, at least four offsets are required to represent the 504 cell IDs. Accordingly, in a preferred embodiment of the present invention, it is proposed to limit the number of root indices of the ZC sequence to be less than the length of M (131) and distinguishes between the 504 (=126*4) cell IDs through the cover sequence multiplied by the ZC sequence in each element.

Meanwhile, FIG. 12 shows that the length-M cover sequence is used to inform the position of the NB-SSS. The NB-SSS may be transmitted less frequently than the NB-PSS as described above, and thus signaling for indicating this may be required. Information on the position where the NB-SSS will be transmitted can be informed through the NB-SSS itself using not only the method of transmitting the information through the cover sequence as shown in FIG. 9 but also the cyclic shift applied to the ZC sequence as described above. In some cases, the above-described offset can be applied to the ZC sequence instead of the cover sequence.

As mentioned in the foregoing description, 131 root indices can be selected in the case of the length-131 ZC sequence. However, when four offsets are used to indicate the 504 cell IDs, root indices showing good performance among the 131 root indices can be used because 126 root indices are selected from among the 131 root indices.

Figure 13:
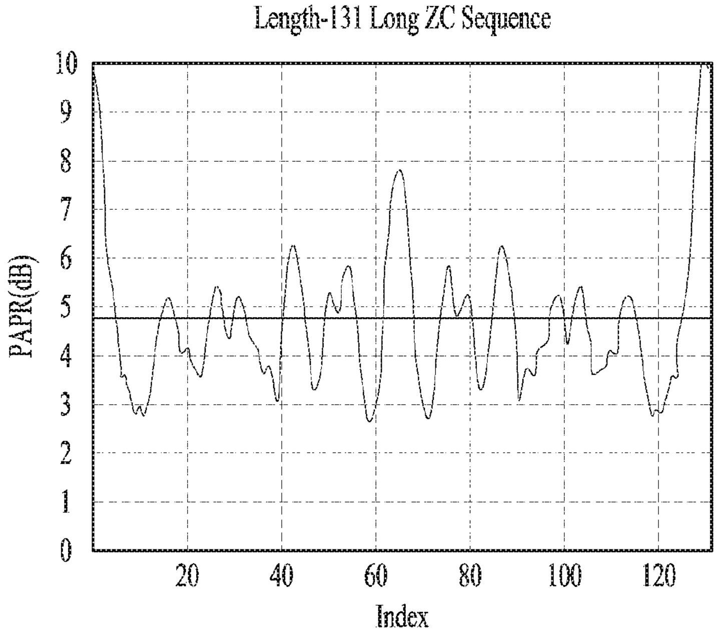
FIG. 13 is diagram illustrating a method for selecting root indices of a ZC sequence to be used for an NB-SSS according to an embodiment of the present invention.
Figure 13:
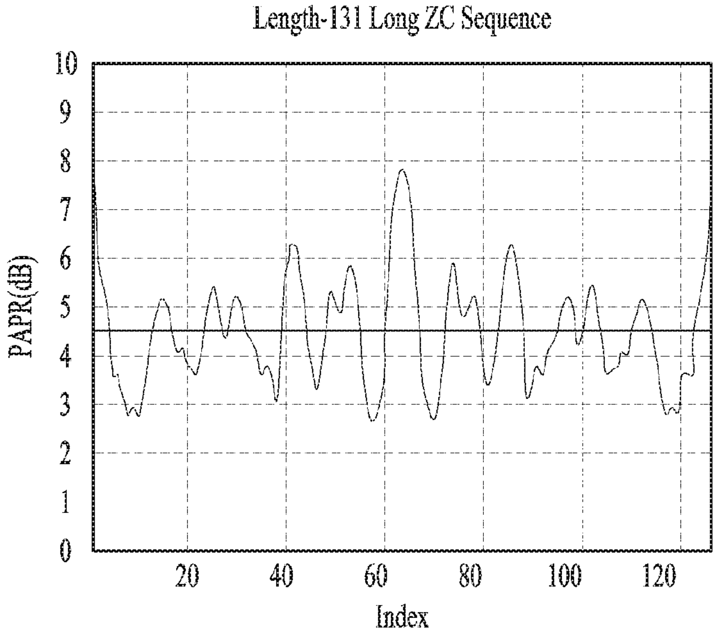

FIG. 13 is diagram illustrating a method for selecting root indices of a ZC sequence to be used for an NB-SSS according to an embodiment of the present invention.

If a long single ZC sequence is used upon configuring the NB-SSS, a PAPR may increase in spite of using the ZC sequence. In this case, the PAPR of the NB-SSS varies depending root indices. In particular, low root indices (high root indices paired therewith) and middle root indices may generate a high PAPR.

A variety of combinations can be considered to represent the 504 PCIDs. For example, 126 root indices×4 additional indices, 84 root indices×6 additional indices, 42 root indices×12 additional indices, etc. may be considered.

In the length-131 ZC sequence, root indices 1, 130, 2, 129, 3, 128, 65, 66, 64, 67, etc. generate high PAPR. Specifically, FIG. 10 (*a*) shows a case where root indices causing high PAPRs are used, and FIG. 10 (*b*) shows a case where root indices indicating low PAPRs are used.

If 126 root indices are used, four root indices are excluded from root indices 1 to 130. Thus, a preferred embodiment of the present invention proposes to use indices 3 to 128 except root indices which cause high PAPRs. In this case, the average PAPR may be decreased. That is, in the present embodiment, it is proposed to select root indices of the length-L ZC sequence used to transmit the NB-SSS from among M root indices (where M is smaller than L) and select the M root indices from a range of [k, M+k−1] using a predetermined offset, k rather than a range of [0, M−1]. In addition, it is also proposed to select the ZC sequence as one among 126 root indices from a range of [3, 128].

The above description will be summarized as follows.

In the NB-LTE system, an NB-SSS can be transmitted with a period of 20 ms. This NB-SSS may indicate not only 504 PCIDs but also a specific position in a range of 80 ms, where transmission is performed.

In addition, the NB-SSS sequence is generated using a length-131 frequency-domain ZC sequence. In this case, root indices may be selected from a range of [3, 128]. Thereafter, a cyclic shift is applied to this ZC sequence, and then it is multiplied by a binary scrambling sequence in each element. In this structure, the 504 PCIDs can be represented by 126 ZC root indices and four binary scrambling sequences. In addition, the position of the NB-SSS in the range of 80 ms can be represented by four cyclic shift values (e.g., 0, 33, 66 and 99).

In this case, the Hadamard sequence shown in Equation 11 can be used as the binary scrambling sequence corresponding to a cover sequence.

$$b_q(n)=\text{Hadamard}_{2_q-1}{}^{128\times128}(\text{mod}(n,128), q=0,1,2,3 \quad \text{[Equation 11]}$$

When the Hadamard sequence is used, the NB-SSS can be configured as follows.

[Equation 12]

$$-SSSu,q,k(n)=Su(n)*bq(n)*Ck(n)$$

$$-Su(n)=e^{j\frac{\pi(u+3)n(n+1)}{131}}, n=0,\ldots,131,$$

$$u=0,\ldots,125$$

$$-bq(n)=Hadamard_{2q-1}^{128\times128}(\text{mod}(n,128)),$$

$$n=0,\ldots,131, q=0,1,2,3$$

$$-C_k(n)=e^{-j\frac{2\pi 33kn}{132}}, n=0,\ldots,131,$$

$$k=0,1,2,3$$

$$-u=\text{mod}(PCID,126), q=\left\lfloor\frac{PCID}{126}\right\rfloor,$$

$k$ = Subframe indication

Hereinafter, a description will be given of how the Hadamard sequence is applied to the above-described structure.

Figure 14:
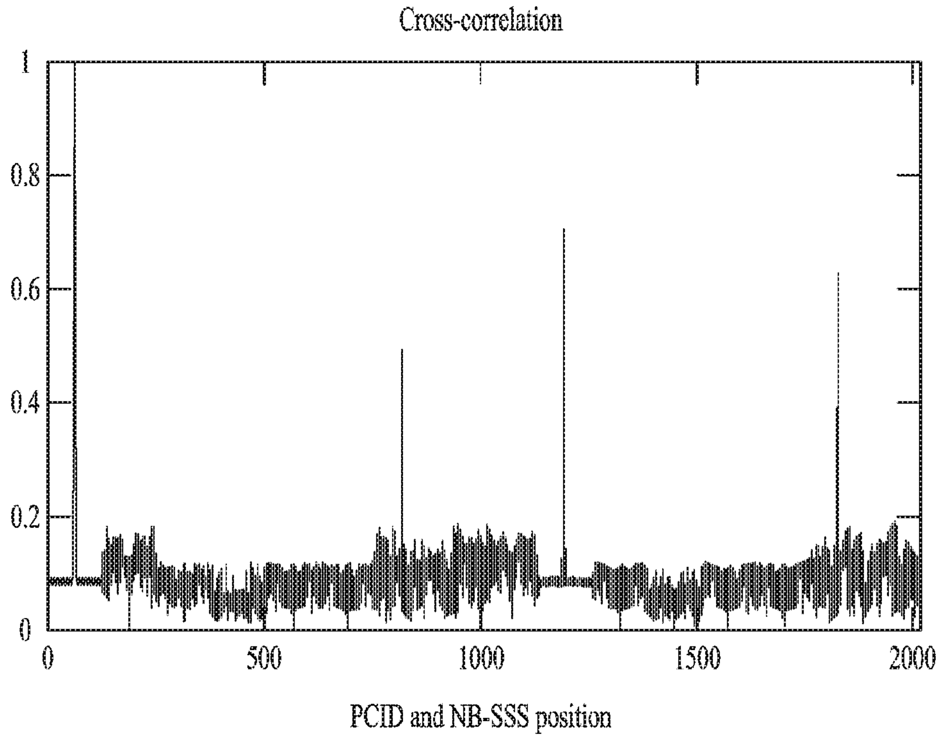
FIG. 14 is a diagram illustrating cross-correlation values when a specific Hadamard sequence is used for an NB-SSS according to an embodiment of the present invention.

FIG. 14 is a diagram illustrating cross-correlation values when a specific Hadamard sequence is used for an NB-SSS according to an embodiment of the present invention.

As shown in FIG. 14, if there is a sequence having the same time-domain cyclic shift as that of the Hadamard sequence (e.g., [1 1 1 1 . . . ], [1 −1 1−1 . . . ]), it may show poor cross-correlation properties.

To solve this problem, an embodiment of the present invention proposes that when four sequences are selected from the Hadamard sequences, the sequences which are not included in a time-domain cyclic shift will be used. For example, if [1 1 1 1 . . . ], [1 −1 1 −1 . . . ], etc. are included in the time-domain cyclic shift, 1 and 2 of a Hadamard matrix are excluded because they are sequences composed of [1 1 1 1 . . . ] [1 −1 1 −1 . . . ]. In this case, if q=0, 1, 2, or 3, it is preferable to select an N (>=4) times multiple of q.

[Equation 13]

$$-SSSu,q,k(n)=Su(n)*bq(n)*Ck(n)$$

$$-Su(n)=e^{j\frac{\pi(u+3)n(n+1)}{131}}, n=0,\ldots,131,$$

$$u=0,\ldots,125$$

$$-bq(n)=Hadamard_{5q}^{128\times128}(\text{mod}(n,128)),$$

$$n=0,\ldots,131, q=0,1,2,3$$

$$-C_k(n)=e^{-j\frac{2\pi 33kn}{132}}, n=0,\ldots,131,$$

$$k=0,1,2,3$$

-continued $$u=\text{mod}(PCID,126), q=\left\lfloor\frac{PCID}{126}\right\rfloor,$$

$k$ = Subframe indication

According to another embodiment of the present invention, a binary Hadamard sequence is configured.

If a time-domain cyclic shift is configured with a complex value, it is possible to generate a sequence existing in a domain different from that of the Hadamard sequence, thereby eliminating ambiguity between the two sequences. For example, if a time-domain cyclic shift is configured with offsets different from 33 offsets in 132 samples, a sequence may have a complex value. Time-domain shift values capable of maintaining an equal distance possible in a length-132 sequence are 32, 34, etc. In addition, 36 offsets can also be assumed.

If the Hadamard sequence and time-domain cyclic shift are configured in different domains, a full orthogonal sequence or a quasi-orthogonal sequence can be applied as the Hadamard sequence.

If the Hadamard matrix is cyclically extended from 128 to 132, sequences with q=0, 1, 2 and 3 become fully orthogonal to each other.

Equations below are examples according to the embodiments. In addition to the following examples, there are various examples which satisfy the above-described principles.

[Equation 14]

$$-SSSu,q,k(n)=Su(n)*bq(n)*Ck(n)$$

$$-Su(n)=e^{j\frac{\pi(u+3)n(n+1)}{131}}, n=0,\ldots,131,$$

$$u=0,\ldots,125$$

$$-bq(n)=Hadamard_{q}^{128\times128}(\text{mod}(n,128)),$$

$$n=0,\ldots,131, q=0,1,2,3$$

$$-C_k(n)=e^{-j\frac{2\pi 33kn}{132}}, n=0,\ldots,131,$$

$$k=0,1,2,3$$

$$u=\text{mod}(PCID,126), q=\left\lfloor\frac{PCID}{126}\right\rfloor,$$

$k$ = Subframe indication

[Equation 15]

$$-SSSu,q,k(n)=Su(n)*bq(n)*Ck(n)$$

$$-Su(n)=e^{j\frac{\pi(u+3)n(n+1)}{131}}, n=0,\ldots,131,$$

$$u=0,\ldots,125$$

$$-bq(n)=Hadamard_{2q-1}^{128\times128}(\text{mod}(n,128)),$$

$$n=0,\ldots,131, q=0,1,2,3$$

$$-C_k(n)=e^{-j\frac{2\pi 33kn}{132}}, n=0,\ldots,131,$$

$$k=0,1,2,3$$

$$-u=\text{mod}(PCID,126), q=\left\lfloor\frac{PCID}{126}\right\rfloor,$$

$k$ = Subframe indication

[Equation 16]

$$-SSSu,q,k(n)=Su(n)*bq(n)*Ck(n)$$

$$-Su(n)=e^{j\frac{\pi(u+3)n(n+1)}{131}}, n=0,\ldots,131,$$

$$u=0,\ldots,125$$

$$-bq(n)=Hadamard_{2q-1}^{128\times128}(\text{mod}(n,128)),$$

$$n=0,\ldots,131, q=0,1,2,3$$

$$-C_k(n)=e^{-j\frac{2\pi 33kn}{132}}, n=0,\ldots,131,$$

$$k=0,1,2,3$$

$$-u=\text{mod}(PCID,126), q=\left\lfloor\frac{PCID}{126}\right\rfloor,$$

$k$ = Subframe indication

-continued $$-SSSu,\, q,\, k(n) = Su(n) * bq(n) * Ck(n) \qquad \text{[Equation 17]}$$

$$-Su(n) = e^{j\frac{\pi(u+3)n(n+1)}{131}},\ n = 0, \ldots , 131,$$

$$u = 0, \ldots , 125$$

$$-bq(n) = Hadamard_q^{128\times128}(\text{mod}(n, 128)),$$

$$n = 0, \ldots , 131,\ q = 0, 1, 2, 3$$

$$-C_k(n) = e^{-j\frac{2\pi 33kn}{132}},\ n = 0, \ldots , 131,$$

$$k = 0, 1, 2, 3$$

$$-u = \text{mod}(PCID, 126),\ q = \left\lfloor \frac{PCID}{126} \right\rfloor,$$

$$k = \text{Subframe indication}$$

$$-SSSu,\, q,\, k(n) = Su(n) * bq(n) * Ck(n) \qquad \text{[Equation 18]}$$

$$-Su(n) = e^{j\frac{\pi(u+3)n(n+1)}{131}},\ n = 0, \ldots , 131,$$

$$u = 0, \ldots , 125$$

$$-bq(n) = Hadamard_{5q}^{128\times128}(\text{mod}(n, 128)),$$

$$n = 0, \ldots , 131,\ q = 0, 1, 2, 3$$

$$-C_k(n) = e^{-j\frac{2\pi 33kn}{132}},\ n = 0, \ldots , 131,$$

$$k = 0, 1, 2, 3$$

$$-u = \text{mod}(PCID, 126),\ q = \left\lfloor \frac{PCID}{126} \right\rfloor,$$

$$k = \text{Subframe indication}$$

Equation 19 below shows an NB-SSS (d(n)) according to another embodiment of the present invention, which corresponds to an example of configuring the Hadamard sequence and a sequence for the cyclic shift.

$$d(n) = b_q(m)e^{-j2\pi\theta_f n}e^{-j\frac{\pi u n'(n'+1)}{131}} \qquad \text{[Equation 19]}$$

In Equation 19, the following equations are satisfied.

$$n = 0, 1, \ldots , 131$$

$$n' = n \bmod 131$$

$$m = n \bmod 128$$

$$u = N_{ID}^{Ncell} \bmod 126 + 3$$

$$q = \left\lfloor \frac{N_{ID}^{Ncell}}{126} \right\rfloor$$

Meanwhile, in Equation 19, a binary sequence $b_q(m)$ can be given as shown in Table 16.

TABLE 16

| q | $b_q(0),\ldots,b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 −1 1 1 −1 1−1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 1 1 −1 1 −1 −1 1 −1 1 1 −1 − 1 1 1 −1 1 −1 −1 1 −1 1 1 −1 1 −1 −1 1 1 −1 −1 1 −1 1 1 −1 1 −1 −1 1 −1 1 1 −1 −1 1 1 −1 1 −1 −1 1 −1 1 1 −1 1 −1 −1 1 1 −1 −1 1 −1 1 1 −1] |
| 2 | [1 −1 −1 1 −1 1 1 −1 −1 1 1 −1 1 −1 −1 1−1 1 1 −1 1−1 −1 1 1 −1 −1 1 −1 1 1−1 −1 1 1−1 1 −1 −1 1 1 −1 −1 1 −1 1 1 −1 1 −1 −1 1 −1 1 1−1 −1 1 1 −1 1 −1 −1 1 1 −1 −1 1 −1 1 1 −1 − 1 1 1 −1 1 −1 −1 1 −1 1 1 −1 1 −1 −1 1 1 −1 −1 1 −1 1 1 −1 −1 1 1 −1 1 −1 −1 1 1 −1 −1 1 −1 1 1 −1 1 −1 −1 1 −1 1 1 −1 −1 1 1 −1 1 −1 −1 1] |
| 3 | [1 −1 −1 1 −1 1 1 −1 −1 1 1 −1 1 −1 −1 1 −1 1 1 −1 1 −1 −1 1 1 −1 −1 1 −1 1 1 −1 −1 1 1−1 1 −1 −1 1 1 −1 −1 1 −1 1 1 −1 1 −1 −1 1 −1 1 1 −1 −1 1 1 −1 1 −1 −1 1 −1 1 1 −1 1 −1 1−1 1 1 −1 −1 1 −1 1 1 −1 1 −1 −1 1 −1 1 1 −1 −1 1 1 −1 1 −1 −1 1 1 −1 −1 1 −1 1 1 −1 −1 1 1 −1 1 − 1 −1 1 −1 1 1 −1 1 −1 −1 1 1 −1 −1 1 −1 1 1 −1] |

In addition, in Equation 19, a cyclic shift value θf in a frame number of can be defined according to Equation 20.

$$\theta_f = \frac{33}{132}(n_f/2)\bmod 4 \qquad \text{[Equation 20]}$$

Resource Structure

Hereinafter, the overall resource structure of the system where the above-described NB-PSS and NB-SSS are applied will be described.

Figure 15:
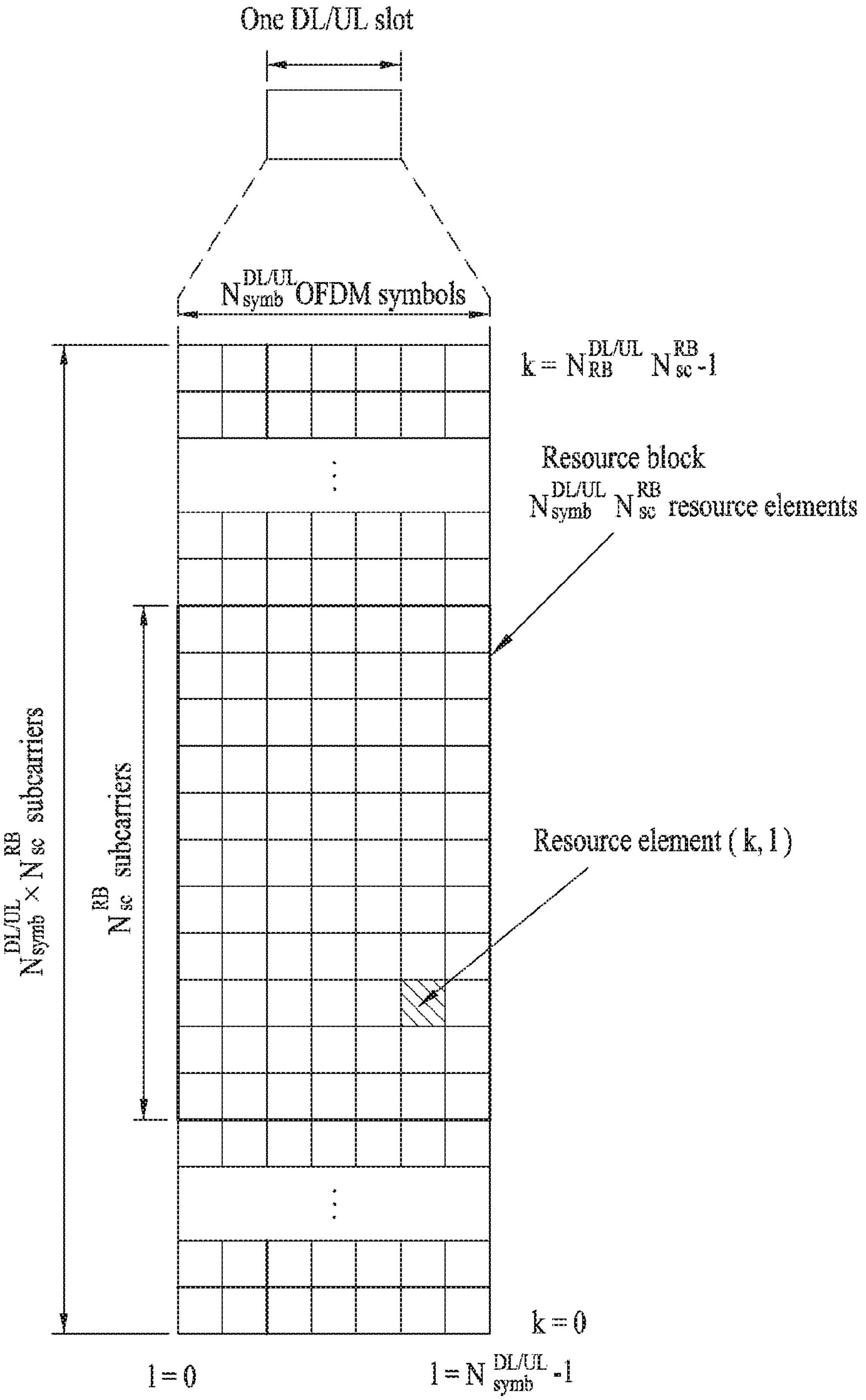
FIG. 15 illustrates an exemplary downlink/uplink (DL/UL) slot structure of the wireless communication system.

FIG. 15 illustrates an exemplary downlink/uplink (DL/UL) slot structure of the wireless communication system.

Referring to FIG. 15, a slot includes a plurality of orthogonal frequency division multiplexing (OFDM) symbols in the time domain and a plurality of resource blocks (RBs) in the frequency domain. The OFDM symbol means one symbol interval. Referring to FIG. 15, a signal transmitted in each slot may be represented by a resource grid composed of $N^{DL/UL}_{RB} \times N^{RB}_{sc}$ subcarriers and $N^{DL/UL}_{symb}$ OFDM symbols. Here, $N^{DL}_{RB}$ indicates the number of resource blocks (RBs) in a DL slot, and $N^{UL}_{RB}$ indicates the number of RBs in a UL slot. $N^{DL}_{RB}$ and $N^{UL}_{RB}$ depend on DL transmission bandwidth and UL transmission bandwidth, respectively. $N^{DL}_{symb}$ denotes the number of OFDM symbols in a DL slot, and $N^{UL}_{symb}$ denotes the number of OFDM symbols in a UL slot. $N^{RB}_{sc}$ denotes the number of subcarriers constructing one RB.

The OFDM symbol may be referred to as a single carrier frequency division multiplexing (SC-FDM) symbol or the like according to multiple access schemes. The number of OFDM symbols included in one slot can be variously changed according to cyclic prefix (CP) lengths. For example, one slot includes seven OFDM symbols in the case of a normal CP, and it includes six OFDM symbols in the case of an extended CP. For convenience of description, although FIG. 12 shows that 7 OFDM symbols are included in one slot of the subframe, the embodiments of the present invention can be equally applied to subframes having different numbers of OFDM symbols.

Referring to FIG. 15, each OFDM symbol includes $N^{DL/UL}_{RB} \times N^{RB}_{sc}$ subcarriers in the frequency domain. The subcarrier may be divided into the following types: a data subcarrier for data transmission; a reference signal subcarrier for transmission of a reference signal; and a null subcarrier for a guard band or a direct current (DC) element. The DC element is mapped to a carrier frequency f0 during an OFDM signal generation process or a frequency up-conversion process. The carrier frequency is also referred to as a center frequency fc.

One RB is defined as $N^{DL/UL}_{symb}$ (e.g., 7) consecutive OFDM symbols in the time domain and $N^{RB}_{sc}$ (e.g., 1) consecutive subcarriers in the frequency domain. For reference, the resource composed of one OFDM symbol and one subcarrier is referred to as a resource element (RE) or tone. Accordingly, one RB is composed of $N^{DL/UL}_{symb} \times N^{RB}_{sc}$ REs. Each RE in the resource grid may be uniquely defined by an index pair (k, 1) in one slot. Here, k indicates an index from 0 to $N^{DL/UL}_{RB} \times N^{RB}_{sc}-1$ in the frequency domain, and 1 indicates an index from 0 to $N^{DL/UL}_{symb}-1$ in the time domain.

Meanwhile, one RB is mapped to one physical resource block (PRB) and one virtual resource block (VRB). In the time domain, the PRB is defined by $N^{DL/UL}_{symb}$ (e.g., 7) consecutive OFDM symbols or SC-FDM symbols. In the frequency domain, the PRB is defined by $N^{RB}_{sc}$ (e.g., 12) consecutive subcarriers. Accordingly, one PRB is composed of $N^{DL/UL}_{symb} \times N^{RB}_{sc}$ REs. Two RBs respectively located in two slots of the subframe while occupying the same $N^{RB}_{sc}$ consecutive subcarriers in one subframe are referred to as a PRB pair. Two RBs constituting the PRB pair have the same PRB number (or PRB index).

Figure 16:
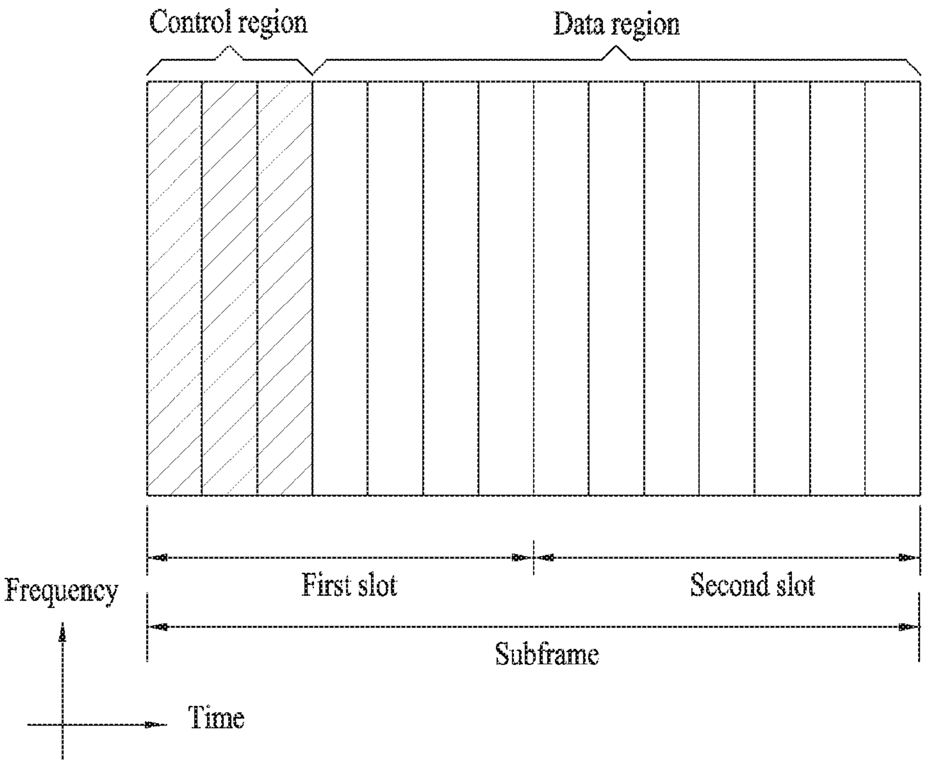
FIG. 16 illustrates an exemplary DL subframe structure used in the wireless communication system.

FIG. 16 illustrates an exemplary DL subframe structure used in the wireless communication system.

Referring to FIG. 16, a DL subframe is divided into a control region and a data region in the time domain. As shown in FIG. 16, up to first three (four) OFDM symbols of the first slot in the subframe corresponds to the control region to which a control channel is allocated. Hereinafter, a resource region available for PDCCH transmission in a DL subframe is referred to as a PDCCH region. The remaining OFDM symbols other than the OFDM symbol(s) used for the control region correspond to the data region to which a physical downlink shared channel (PDSCH) is allocated. Hereinafter, a resource region available for PDSCH transmission in a DL subframe is referred to as a PDSCH region. Examples of the downlink control channels include, for example, a physical control format indicator channel (PCFICH), a physical downlink control channel (PDCCH), a physical hybrid automatic repeat request indicator channel (PHICH), etc. The PCFICH is transmitted at the first OFDM symbol of a subframe and carries information on the number of OFDM symbols used for transmitting a control channel in the subframe. The PHICH carries a hybrid automatic repeat request (HARQ) acknowledgement/negative-acknowledgement (ACK/NACK) signal in response to uplink transmission.

The control information transmitted through the PDCCH is referred to as downlink control information (DCI). The DCI includes resource allocation information and other control information for a UE or UE group. The transmit format and resource allocation information of a downlink shared channel (DL-SCH) is also referred to as DL scheduling information or a DL grant, and the transmit format and resource allocation information of an uplink shared channel (UL-SCH) is referred to as UL scheduling information or a UL grant. The size and usage of the DCI carried by one PDCCH may vary according to DCI formats, and the size may also vary according to coding rates. In the current 3GPP LTE system, formats 0 and 4 have been defined for uplink and various formats 1, 1A, 1B, 1C, 1D, 2, 2A, 2B, 2C, 3, 3A, etc. have been defined for downlink. According to usage of each DCI format, any combination of control information such as hopping flag, RB allocation, modulation and coding scheme (MCS), redundancy version (RV), new data indicator (NDI), transmit power control (TPC), cyclic shift demodulation reference signal (DM RS), UL index, channel quality information (CQI) request, DL assignment index, HARQ process number, transmitted precoding matrix indicator (TPMI), precoding matrix indicator (PMI), etc. is transmitted to a UE as downlink control information.

A plurality of PDCCHs can be transmitted in the control region. A UE can monitor the plurality of PDCCHs, and an eNB determines a DCI format according to DCI to be transmitted to a UE and attaches cyclic redundancy check (CRC) to the DCI. The CRC is masked (or scrambled) with an identifier (e.g., radio network temporary identifier (RNTI)) according to an owner or usage of the PDCCH. For example, if the PDCCH is for a specific UE, an identifier of the UE (e.g., cell-RNTI (C-RNTI)) may be masked to the CRC. If the PDCCH is for a paging message, a paging identifier (e.g., paging radio network temporary identifier (P-RNTI)) may be masked to the CRC. If the PDCCH is for system information (more specifically, a system information block (SIB)), a system information RNTI (SI-RNTI) may be masked to the CRC. If the PDCCH is for random access response, a random access-RNTI (RA-RNTI) may be masked to the CRC. For example, CRC masking (or scrambling) includes XOR operation of the CRC and RNTI at a bit level.

The PDCCH is transmitted on aggregation of one or a plurality of consecutive control channel elements (CCEs). The CCE is a logical allocation unit used to provide the PDCCH with a coding rate based on the state of a radio channel. The CCE corresponds to a plurality of resource element groups (REGs). For example, one CCE corresponds to nine REGs, and one REG corresponds to four REs. Four QPSK symbols are mapped to each REG. The RE occupied by a reference signal (RS) is not included in the REG. Accordingly, the number of REGs in a given OFDM symbol varies depending on whether the RS is present. The concept of the REG is also applied to other downlink control channels (e.g., PCFICH and PHICH). The DCI format and the number of DCI bits are determined according to the number of CCEs. The CCEs are numbered and consecutively used and, in order to simplify a decoding process, the PDCCH having a format composed of n CCEs can start at only a CCE having a number corresponding to a multiple of n. The number of CCEs used for transmitting a specific PDCCH is determined according to the channel state or by the network or eNB. For example, if the PDCCH is for a UE having a good DL channel (e.g., adjacent to the eNB), only one CCE can be sufficient. However, if the PDCCH is for a UE having a poor channel state (e.g., located near a cell edge), eight CCEs may be required to obtain sufficient robustness. In addition, the power level of the PDCCH may be controlled according to the channel state.

Apparatus Configuration

Figure 17:
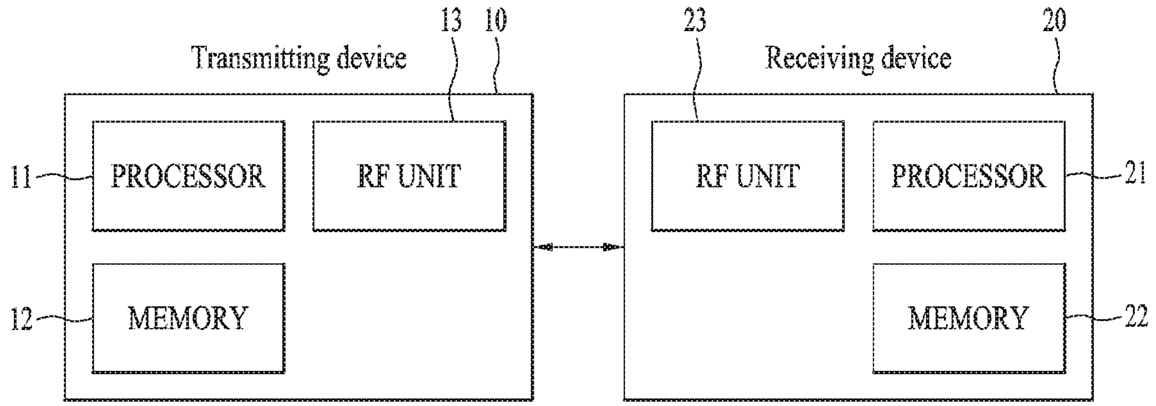
FIG. 17 is a block diagram illustrating the components with of a transmitting device 10 and a receiving device 20 for implementing the embodiments of the present invention.

FIG. 17 is a block diagram showing the components of a transmitting device 10 and a receiving device 20 for performing embodiments of the present invention.

The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 operatively connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signal. The memories 12 and 22 may be used as a buffer.

The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing embodiments of the present invention by hardware, application specific integrated circuits (ASICs), Digital signal processors (DSPs), digital signal processing devices (DSPDs), programmable logic devices (PLDs), field programmable gate arrays (FPGAs), etc. configured to perform embodiments of the present invention may be included in the processors 11 and 21. If operations or functions of embodiments of the present invention are implemented by firmware or software, firmware or software may be configured to include modules, procedures, functions, etc. for performing the functions or operations of embodiments of the present invention. The firmware or software configured to perform embodiments of the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiver in the form of one or more layers. For frequency up-conversion, the RF unit 13 may include an oscillator. The RF unit 13 may include $N_t$ ($N_t$ being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include $N_r$ ($N_r$ being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

Each of the RF units 13 and 23 includes one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antennal elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink. Hereinafter, the processor, the RF unit and the memory included in the UE are respectively referred to as a UE processor, a UE RF unit and a UE memory and the processor, the RF unit and the memory included in the eNB are respectively referred to as an eNB processor, an eNB RF unit and an eNB memory.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention is applicable to various wireless systems supporting narrowband communication in order to provide an IoT service in addition to a wireless communication system for providing an IoT service based on an LTE system.

What is claimed is:

1. A user equipment (UE) operating in a narrowband Internet of Things (NB IoT) system, the UE comprising:

a transceiver configured to receive an NB primary synchronization signal (NB PSS) based on a first Zadoff-Chu sequence having one predefined root index on a plurality of orthogonal frequency division multiplexing (OFDM) symbols, and to receive an NB secondary synchronization signal (NB SSS) based on a second Zadoff-Chu sequence; and a processor configured to process the NB PSS and the NB SSS received by the transceiver, wherein the processor identifies an NB cell identifier only based on the NB SSS among the NB PSS and the NB SSS, wherein the first Zadoff-Chu sequence is multiplied in each of the plurality of OFDM symbols by each element of a cover sequence, wherein the second Zadoff-Chu sequence is multiplied by each element of a scrambling sequence, and wherein a multiplication between the first Zadoff-Chu sequence and the cover sequence is in a unit of OFDM symbol while a multiplication between the second Zadoff-Chu sequence and the scrambling sequence is in a unit of element of each sequence.

2. The UE of claim 1, wherein the NB IoT system provides communication service through a narrow band corresponding to a partial system bandwidth of a wireless communication system.

3. The UE of claim 1, wherein the plurality of OFDM symbols are consecutively arranged in a time domain.

4. The UE of claim 1, wherein the number of the plurality of OFDM symbols is equal to a difference between the number of OFDM symbols included in one subframe and the number of OFDM symbols available for transmission of a physical downlink control channel (PDCCH).

5. The UE of claim 1, wherein the transceiver receives the NB PSS and the NB SSS with a subcarrier spacing of 15 kHz.

6. An evolved node B (eNB) operating in a narrowband Internet of Things (NB IoT) system, the eNB comprising:

a processor configured to generate an NB primary synchronization signal (NB PSS) based on a first Zadoff-Chu sequence having one predefined root index on a plurality of orthogonal frequency division multiplexing (OFDM) symbols, and to generate an NB secondary synchronization signal (NB SSS) based on a second Zadoff-Chu sequence; and a transceiver connected to the processor and configured to transmit the NB PSS and the NB SSS to at least one user equipment (UE), wherein the processor is configured to generate the NB PSS by multiplying, in a unit of OFDM symbol, the first Zadoff-Chu sequence and each element of a cover sequence, wherein the processor is configured to generate the NB SSS by multiplying, in a unit of element of each sequence, the second Zadoff-Chu sequence and a scrambling sequence, and wherein only the NB SSS, among the NB PSS and the NB SSS, is used for identifying an NB cell identifier.

7. The eNB of claim 6, wherein the NB IoT system provides communication service through a narrow band corresponding to a partial system bandwidth of a wireless communication system.

8. The eNB of claim 6, wherein the plurality of OFDM symbols are consecutively arranged in a time domain.

9. The eNB of claim 6, wherein the number of the plurality of OFDM symbols is equal to a difference between the number of OFDM symbols included in one subframe and the number of OFDM symbols available for transmission of a physical downlink control channel (PDCCH).

10. The eNB of claim 6, wherein the transceiver transmits the NB PSS and the NB SSS with a subcarrier spacing of 15 kHz.

* * * * *